(12) United States Patent
Mani et al.

(10) Patent No.: US 9,063,741 B2
(45) Date of Patent: *Jun. 23, 2015

(54) MODE-SWITCHED VARIABLE SIGNAL ATTRIBUTES IN BLOCK DIAGRAMS

(71) Applicant: The MathWorks, Inc., Natick, MA (US)

(72) Inventors: Ramamurthy Mani, Wayland, MA (US); Dong Jia, Brookline, MA (US); Haihua Feng, Sherborn, MA (US); Alongkrit Chutinan, Ashland, MA (US); Qu Zhang, Holliston, MA (US); Vijay Raghavan, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 143 days.

This patent is subject to a terminal disclaimer.

(21) Appl. No.: 13/647,811

(22) Filed: Oct. 9, 2012

(65) Prior Publication Data

US 2013/0042257 A1    Feb. 14, 2013

Related U.S. Application Data

(63) Continuation of application No. 12/252,536, filed on Oct. 16, 2008, now Pat. No. 8,286,129.

(60) Provisional application No. 60/980,403, filed on Oct. 16, 2007.

(51) Int. Cl.
G06F 9/44        (2006.01)

(52) U.S. Cl.
CPC ..................................... *G06F 8/34* (2013.01)

(58) Field of Classification Search
None
See application file for complete search history.

(56) References Cited

U.S. PATENT DOCUMENTS

| 5,905,649 | A  | 5/1999  | Sojoodi et al. |
| 6,366,300 | B1 | 4/2002  | Ohara et al. |
| 8,286,129 | B2 * | 10/2012 | Mani et al. ..................... 717/105 |
| 2003/0005270 | A1 | 1/2003 | Bartlett et al. |
| 2003/0016234 | A1 | 1/2003 | Mani et al. |
| 2004/0208193 | A1 | 10/2004 | Orofino et al. |
| 2004/0210592 | A1 | 10/2004 | Ciolfi et al. |

OTHER PUBLICATIONS

Ledeczi, Akos et al., "Composing Domain-Specific Design Environments," Computer, vol. 34(11):44-51 (2001).
Decision to Refuse a European Patent Application for Application No. EP08839109.9, 13 pages, dated Jul. 17, 2014.
Minutes of the Oral Proceedings Befor the Examining Division for Application No. EP08839109.9, 8 pages, dated Jul. 17, 2014.

* cited by examiner

*Primary Examiner* — Chuck Kendall
(74) *Attorney, Agent, or Firm* — Nelson Mullin Riley & Scarborough LLP

(57) ABSTRACT

A programming element is provided that defines model attributes in response to mode change events in a graphical modeling environment. Such definition may involve any signal attribute such as dimensions, data types, complexity and sample times. Events that trigger definition of model attributes may be explicit signaling events generated by other elements, elements within the block diagram programming environment, and elements external from the environment. Implicit events may also trigger definition of model attributes, such as a change of attribute in an input signal.

63 Claims, 14 Drawing Sheets

MODE-SWITCHED VARIABLE SIGNAL ATTRIBUTES IN BLOCK DIAGRAMS

RELATED APPLICATIONS

This application is a continuation of U.S. patent application Ser. No. 12/252,536, filed Oct. 16, 2008, now U.S. Pat. No. 8,286,129, which claims priority under 35 U.S.C. 119(e) to U.S. Provisional Application Ser. No. 60/980,403, entitled "MODE-SWITCHED VARIABLE SIGNAL ATTRIBUTES IN BLOCK DIAGRAMS," by Ramamurthy Mani, filed Oct. 16, 2007. The above-noted applications are incorporated herein by reference in their entirety.

BACKGROUND

Various classes of block diagrams may be used to describe computations that can be performed on application specific computational hardware, such as a computer, microcontroller, FPGA, and custom hardware or general purpose hardware such as a commercially-available computer system or microprocessor. Classes of these block diagrams can include time-based block diagrams, such as those implemented within graphical modeling environments, state-based and flow diagrams, and data-flow diagrams. Graphical modeling environments such as block diagram programming environments generally permit a user to define and use graphical elements to represent system behavior. These elements may be, in one example, elements that are interconnected graphically to create a representation of a modeled system.

Graphical modeling environments (e.g., as provided by graphical programming tools) may assist in simplifying the process of designing, simulating, and implementing dynamic systems. Tools provided in such modeling environments may permit a user to create a graphical representation of a system, such as a time-based block diagram representation, a statistical diagram, a timing diagram, and other similar graphical elements that can be used to describe system behavior.

SUMMARY

According to one aspect, a computer-readable medium is provided comprising computer-executable instructions that when executed on a processor propagate attributes in a graphical model. The medium includes instructions for displaying a graphical model representing a system configured to operate using a first behavior, the graphical model comprising a first element having a first attribute, a second element, and instructions for associating a mode switching event with the first element. The medium further includes instructions for propagating the first attribute within the first element, or propagating the first attribute from the first element to the second element in response to the mode switching event, and instructions for executing the graphical model using the propagated first attribute to produce an execution result that reflects a second behavior of the graphical model.

According to one embodiment, the at least one attribute comprises at least one signal attribute that includes at least one of a signal dimension, a signal data type, a signal complexity or a signal sample time. According to one embodiment, the medium further comprises instructions for selectively resetting a state associated with the at least one element in response to the propagating the at least one attribute. According to another embodiment, the mode switching event includes an explicit event or an implicit event.

According to another embodiment, the mode switching event is generated by at least one of a state transition diagram, a discrete event diagram, or a block diagram. According to another embodiment, the first element includes at least one port, and wherein the mode switching event is in response to a change in attribute of a received signal associated with the at least one port. According to another embodiment, the graphical model includes at least one of a time-based block diagram or a dataflow diagram.

According to one embodiment, the medium further comprises instructions for indicating that the at least one element propagates the at least one attribute in response to the mode switching event. According to one embodiment, the medium further comprises instructions for receiving a flag, the flag indicating that the first element can process the mode switching event.

According to another embodiment, the first element includes at least one input port and at least one output port, and wherein the first attribute is a dimension, and wherein the computer-readable medium further comprises instructions for receiving a map defining at least one constraint, the constraint identifying a dimension of the at least one input port, the dimension used to determine a dimension of the at least one output port, and instructions, responsive to a selection of the at least one constraint, for setting the dimension of the at least one output port based on the selected at least one constraint.

According to another aspect, a computer-readable medium is provided comprising computer-executable instructions that when executed on a processor modify an operating mode for a system. The medium includes instructions for operating the system in a first mode having a first set of behavior, instructions for receiving a mode switching event, instructions for operating the system in a second mode having a second set of behavior based on the received mode switching event, and instructions, responsive to receiving the mode switching event, for executing the instructions for operating the system in the second mode.

According to one embodiment, the computer-executable instructions are generated from a graphical model representing a modeled system. According to another embodiment, the graphical model comprises a first element having a first attribute and a second element, and wherein the computer-readable medium further holds instructions for associating the mode switching event with a first element of the graphical model, and instructions for propagating the first attribute within the first element, or propagating the first attribute from the first element to the second element in response to the mode switching event.

According to another embodiment, the first set of behavior is operable to permit the system to process a first set of conditions by the system, and wherein the second set of behavior is operable to permit the system to process a second set of conditions by the system. According to another embodiment, the instructions responsive to receiving the mode switching event are executed by the system at runtime.

According to another embodiment, the graphical model comprises a first element including at least one input port and at least one output port, and wherein the computer-readable medium further comprises instructions for receiving a map defining at least one constraint, the constraint identifying a dimension of the at least one input port, the dimension used to determine a dimension of the at least one output port, and instructions, responsive to a selection of the at least one constraint, for setting the dimension of the at least one output port based on the selected at least one constraint.

According to another embodiment, the graphical model comprises a first element having a first attribute, and wherein code associated with the first element is responsive to the received mode switching event. According to another embodiment, the code associated with the first model is capable of propagating the first attribute in response to the received mode switching event. According to another embodiment, the code is adapted to propagate the first attribute during execution of the code.

According to another aspect, a system is provided comprising a memory configured to store code representing a graphical model representing a modeled system, the graphical model having at least one element having associated code that is configured to propagate, through the element or to another element, at least one attribute associated with a port of the element, and a processor configured to execute the code, and responsive to a mode switching event, propagates the at least one attribute. According to one embodiment, the system operates in a first mode having a first set of behavior, and in response to receiving the mode switching event, the system operates in a second mode having a second set of behavior. According to another embodiment, the mode switching event is in response to a change in attribute of a received signal associated with the port of the element.

According to another aspect, a computer-readable medium is provided comprising computer-executable instructions that when executed on a processor determine attributes in a graphical model. The medium includes instructions for displaying a graphical model representing a system configured to operate using a first behavior, the graphical model having a fixed model variable access structure and comprising a first element having a first attribute, a second element having a second attribute, and instructions for associating a mode switching event with the first element, instructions for determining the second attribute to be consistent with the first attribute, the instructions for determining being responsive to the mode switching event, instructions for executing the graphical model using the determined second attribute to produce an execution result that reflects a second behavior according to the second attribute of the graphical model.

According to one embodiment, the fixed model variable access structure is a fixed read structure. According to another embodiment, the fixed model variable access structure is a fixed write structure. According to another embodiment, the fixed model variable access structure is a fixed read and write structure. According to another embodiment, the fixed model variable access structure is a fixed compile-time structure. According to another embodiment, the instructions for determining propagate the first attribute to the second attribute. According to another embodiment, the instructions for determining further comprise instructions for solving at least one constraint associated with the first attribute and at least one constraint associated with the second attribute.

According to one embodiment, the at least one constraint associated with the first attribute and the at least one constraint associated with the second attribute are related. According to another embodiment, the at least one constraint associated with the first attribute and the at least one constraint associated with the second attribute are a same constraint. According to another embodiment, the first element and the second element are not directly connected. According to another embodiment, the first element and the second element are connected via a nondirect feedthrough element. According to another embodiment, the nondirect feedthrough element comprises an input and an output, and wherein the nondirect feedthrough element does not have a direct relationship between the input and the output. According to another embodiment, the nondirect feedthrough element includes at least one of a group comprising a delay element, a pre element, a shift element, and a memory element. According to another embodiment, the nondirect feedthrough element includes a filter block.

According to another embodiment, the instructions for determining the second attribute include instructions that permit the user to define a process by which the second attribute is determined. According to another embodiment, the computer-readable medium further comprises instructions that, when executed, display to a user an option to select a functionality that determines the second attribute responsive to the mode switching event. According to another embodiment, the at least one attribute comprises at least one signal attribute that includes a signal dimension. According to another embodiment, the at least one attribute comprises at least one signal attribute that includes a signal data type.

According to one embodiment, the at least one attribute comprises at least one signal attribute that includes a signal complexity. According to another embodiment, the at least one attribute comprises at least one signal attribute that includes a signal sample time. According to another embodiment, the at least one attribute comprises at least one signal attribute that includes a signal invocation specification. According to another embodiment, the computer-readable medium further comprises instructions for selectively resetting a state associated with the at least one element in response to the instructions for determining the at least one attribute.

According to another embodiment, the mode switching event includes an explicit event. According to another embodiment, the mode switching event includes an implicit event. According to another embodiment, the mode switching event is generated by at least one of a state transition diagram, a discrete event diagram, a block diagram, a dataflow diagram, sequence diagram, scenario diagram, truth table, state transition matrix, entity flow diagram, queue/server network, and function block diagram. According to another embodiment, the first element includes at least one port, and wherein the mode switching event is in response to a change in attribute of a received signal associated with the at least one port.

According to one embodiment, the graphical model includes at least one of a time-based block diagram, activity diagram, or a dataflow diagram. According to another embodiment, the computer-readable medium further comprises instructions for indicating that the at least one element propagates the at least one attribute in response to the mode switching event. According to another embodiment, the computer-readable medium further comprises instructions for receiving a flag, the flag indicating that the first element can process the mode switching event. According to another embodiment, the first element includes at least one input port and at least one output port, and wherein the first attribute is a dimension, and wherein the computer-readable medium further comprises instructions for receiving a map defining at least one constraint, the constraint identifying a dimension of the at least one input port, the dimension used to determine a dimension of the at least one output port, and instructions, responsive to a selection of the at least one constraint, for setting the dimension of the at least one output port based on the selected at least one constraint.

According to one aspect of the present invention, a computer-readable medium comprising computer-executable instructions that when executed on a processor modify an operating mode for a system, the computer-executable instructions being generated from a graphical model representing the system, the graphical model having a fixed model variable access structure is provided. The medium includes instructions for operating the system represented by the graphical model in a first mode having a first behavior, instructions for receiving a mode switching event, instructions for operating the system in a second mode having a second behavior based on the received mode switching event, and instructions, responsive to receiving the mode switching event, for executing the instructions for operating the system in the second mode. According to one embodiment, the graphical model comprises a first element having a first attribute and a second element, and wherein the computer-readable medium further holds instructions for associating the mode switching event with a first element of the graphical model, instructions for representing a first element having a first attribute, instructions for representing a second element having a second attribute, and instructions for associating a mode switching event with the first element, instructions for determining the second attribute to be consistent with the first attribute, the instructions for determining being responsive to the mode switching event.

According to another embodiment, the fixed model variable access structure is a fixed read structure. According to another embodiment, the fixed model variable access structure is a fixed write structure. According to another embodiment, the fixed model variable access structure is a fixed read and write structure. According to another embodiment, the fixed model variable access structure is a fixed compile-time structure.

According to one embodiment, the instructions for determining are adapted to propagate the first attribute to the second attribute. According to another embodiment, the instructions for determining further comprise instructions for solving at least one constraint associated with the first and second attributes. According to another embodiment, the first element and the second element are not directly connected.

According to another embodiment, the second element includes a nondirect feedthrough characteristic. According to another embodiment, the first element and the second element are connected via a nondirect feedthrough element. According to another embodiment, the nondirect feedthrough element comprises an input and an output, and wherein the nondirect feedthrough element does not have a direct relationship between the input and the output.

According to another embodiment, the nondirect feedthrough element includes a delay block. According to another embodiment, the nondirect feedthrough element includes a memory block. According to another embodiment, the instructions for determining the second attribute include instructions that permit the user to define a process by which the second attribute is determined. According to another embodiment, the computer-readable medium further comprises instructions that, when executed, display to a user an option to select a function that determines the second attribute responsive to the mode switching event.

According to one embodiment, the first behavior is operable to permit the system to process a first set of conditions by the system, and wherein the second behavior is operable to permit the system to process a second set of conditions by the system. According to another embodiment, the instructions responsive to receiving the mode switching event are executed by the system at runtime. According to another embodiment, the graphical model comprises a first element including at least one input port and at least one output port, and wherein the computer-readable medium further comprises instructions for receiving a map defining at least one constraint, the constraint identifying a dimension of the at least one input port, the dimension used to determine a dimension of the at least one output port, and instructions, responsive to a selection of the at least one constraint, for setting the dimension of the at least one output port based on the selected at least one constraint. According to another embodiment, the graphical model comprises a first element having a first attribute, and wherein code associated with the first element is responsive to the received mode switching event. According to another embodiment, the code associated with the first model is capable of propagating the first attribute in response to the received mode switching event. According to another embodiment, the code is adapted to propagate the first attribute during execution of the code.

According to one aspect of the present invention, a system comprises a memory configured to store information representing a graphical model representing a modeled system, the graphical model having a fixed model variable access structure and including at least one element, the at least one element having associated code that is configured to make at least one attribute associated with a port of the element consistent another attribute of the at least one element or another element, and a processor configured to execute the code, and responsive to a mode switching event, defining the at least one attribute to be consistent with the another attribute. According to one embodiment, the system operates in a first mode having a first behavior, and in response to receiving the mode switching event, the system operates in a second mode having a second behavior. According to another embodiment, the mode switching event is in response to a change in attribute of a received signal associated with the port of the element. According to another embodiment, the attribute is propagated through the at least one element or to another element. According to another embodiment, the fixed model variable access structure is a fixed read structure. According to another embodiment, the fixed model variable access structure is a fixed write structure. According to another embodiment, the fixed model variable access structure is a fixed read and write structure. According to another embodiment, the fixed model variable access structure is a fixed compile-time structure.

Further features and advantages as well as the structure and operation of various embodiments are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF SUMMARY OF THE DRAWINGS

The accompanying drawings are not intended to be drawn to scale. In the drawings, each identical or nearly identical component that is shown in various figures may be represented by a like numeral. For the purpose of clarity, not every component may be labeled in every drawing. In the drawings.

DETAILED DESCRIPTION

Figure 1:
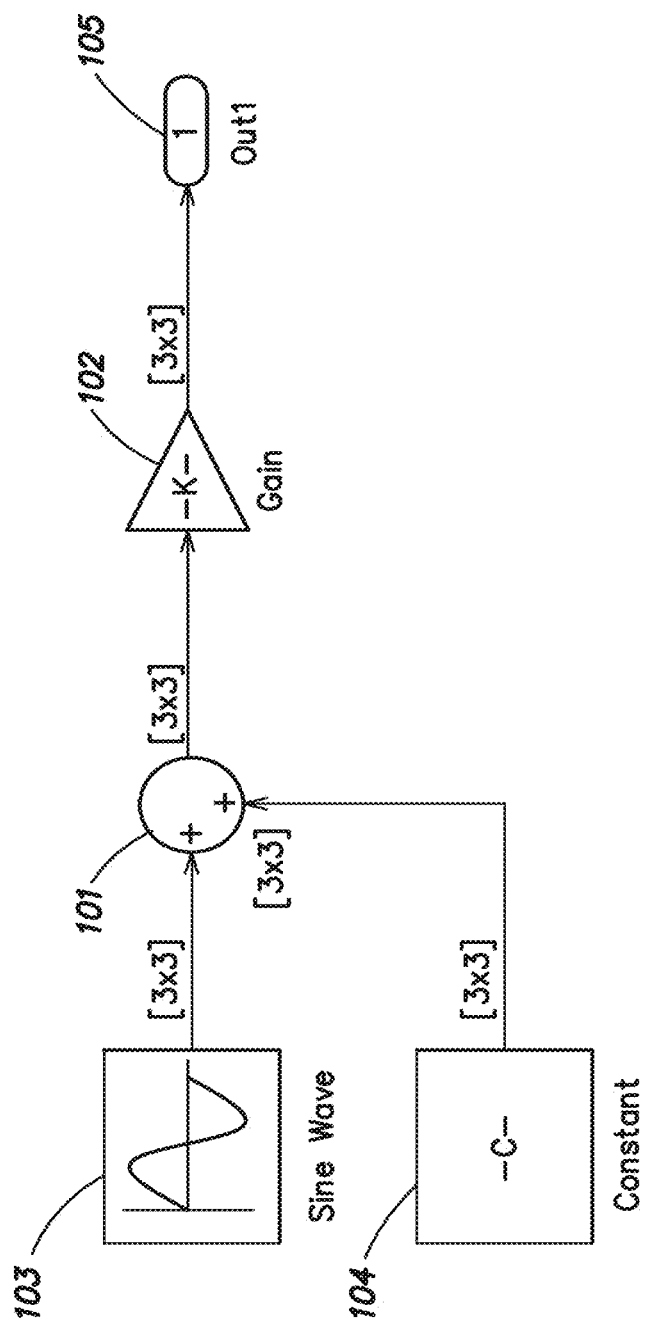
FIG. 1 shows an example system that can be modeled using modeling software.

As discussed, graphical modeling languages (e.g., a graphical programming language such as a block diagram programming language) may be used to model a program. Graphical modeling languages may benefit from elements (e.g., block diagram elements) that can operate in different modes. For instance, elements of the block diagram may exhibit different behavior when functioning in different modes. In some block diagrams, it may be beneficial to have the ability to process different types of data, and it may be beneficial to modify the execution behavior of one or more elements of the diagram when the different types of data are changed.

Conventional techniques of graphical programming have elements that are limited in their function during execution points where attributes such as dimension, initial conditions, and complexity are changed. For instance, a sum block that computes the sum of two inputs may be provided in a model of a system. When a dimension of one of the inputs of the sum block does not match a dimension on one of the other input because of a change in input signal dimensions, an error may occur because of the difference in signal dimensions and the inability of the element to resolve such a difference.

Further, it is appreciated that conventional techniques for graphical programming are limited in that some types of elements, such as elements not having a direct feedthrough, are incapable of directly relating an input to an output, and mode changes involving signal attributes are incapable of traversing elements having nondirect feedthrough characteristics. As defined herein, a direct feedthrough of an element relates an input of the element to an output of the element. A direct feedthrough need not relate all inputs to outputs, but elements may have inputs that have direct feedthrough. In one example, in a lazy (or delayed) evaluation scheme, the output of a function may be computed without the need to have all input values available.

The direct relation could be between one or more of the element input values and one or more of the element output values. In case of port based input and output, the direct feedthrough could be differentiated between pairs of input port and output port. If the ports have sizes or dimensions larger than 1, the direct feedthrough could be differentiated pairwise between respective elements or sets of elements of the input and output ports. The relation between input and output values could be an instantaneous relation. For instance, the instantaneous relation could be a functional relation that relates an input value to an output value, such as an algorithmic relation. Other functional relations could be used, such as an equality (e.g., as represented by an algebraic equation).

Nondirect feedthrough between a pair of variable values of an element indicates that there is no direct relation between the pair of variable values. A nondirect feedthrough element may have no direct feedthrough between any permutation of input/output pairs. Examples of nondirect feedthrough elements includes delay blocks, shift blocks, memory blocks, and other types of elements that do not relate input vales to outputs. In another example, there exists an element (e.g., a block) having a 'pre' operator that prepends a sequence of values with an initial value. This 'pre' operator is also an example of an entity that has nondirect feedthrough charateristics. Also, there may be elements that have nondirect feedthrough characteristics for certain input/output pairs. Because there is no direct relation between input values (or other attributes) of some types of elements used in graphical programming, there is difficulty using conventional programming methods for modeling mode changes using such nondirect feedthrough elements.

Many types of systems may include elements that can act upon different types of signals having parameters that can change dimension, data type, etc. An exemplary embodiment can include a programming element having a fixed model variable access structure that handles changes in attribute(s). A model variable access structure includes the structure of read and write access of variable of a model. Access functionality of a variable may include, for example, equations, assignments, functions, procedures, and methods.

In one embodiment, the model may have a fixed write structure, where the functionality that writes to a variable does not change during execution. In another embodiment, the model may include a fixed read structure, where the functionality that reads a variable does not change during execution. Further, in another embodiment, the model includes a fixed read/write structure, where the functionality that writes a variable and the functionality that reads a variable does not change during execution. A compile-time read and/or write structure that is fixed means that the functionality that reads and/or writes a variable during execution does not change when the model is compiled. Thus, the fixed nature of the read/write ensures computational causality. Computational causality refers to an order of computations that can be determined So, a write may be determined to always or necessarily occur before a read or vice versa. This implies a causal relation between the read and write in terms of their computation, hence, computational causality. A block diagram may be computationally causal and noncausal. In case of the latter, the block diagram may be a graphical representation of a system differential and algebraic equations.

According to one embodiment, the model can propagate changed attributes to other elements as appropriate. Such a propagation of attributes may ensure consistency among the other elements that operate in different modes. In one example system, an element (e.g., a block) having a fixed read/write structure may be provided that is responsive to a change in attributes, and modifies its execution behavior as a result. For instance, one type of element that may be responsive to mode changes includes a nondirect feedthrough element.

In one example implementation, the amount of code necessary to implement these elements in a block diagram programming environment may be reduced because elements used in exemplary embodiments can respond to changes in attributes. For instance, by having elements that operate in different modes, the complexity of a system design is reduced, as alternative portions of a design that support behavior in different modes are not necessary. Thus, system behavior may be represented (e.g., in a block diagram) in a more general way, and using less elements (e.g., in a block diagram).

Block diagram environments may include block diagrams having blocks that support signals having a variety of functional signal attributes. For example, a gain block may support n-dimensional signals with each dimension being of any size, a range of data types, real, imaginary, and complex signals, a variety of both continuous and discrete sample times, etc. These functional attributes can modify the semantics or functional behavior of a graphical model (e.g., a block diagram, state diagram, data flow diagram, etc.). Further, blocks may be arranged to represent and model systems or portions of systems (e.g., subsystems). Also, systems may be hierarchically arranged such that subsystems may contain one or more blocks arranged in a block diagram.

In an exemplary embodiment, signal attributes for an instance of a block may be finalized (or fixed) prior to executing a block diagram. For instance, an embodiment may compile the diagram prior to executing the diagram. Compiling the diagram may include propagating signal attributes to a given block from all other blocks that are connected to this block. The compiler may create instances of each block of the block diagram, including the possible behavior that each block may exhibit during runtime. In this way, blocks may be defined that exhibit polymorphic behavior during runtime (e.g., exhibit different context-dependent behavior during runtime). Generally, polymorphism behavior is determined during design time, as all possible behavior is determined during compilation and incorporated in an element. This concept is illustrated in FIG. 1.

FIG. 1 includes sum block 101, gain block 102, sine block 103, constant block 104 and sink 105. Sum block 101 can include logic that adds two or more input signals together to yield a summed output signal. Gain block 102 may include logic that amplifies a received signal by a gain value to yield an amplified output signal. Sine block 103 can include logic that generates data values that can represent a waveform, such as a sinusoidal waveform. Constant block 104 may include logic that yields a value, such as a fixed value. Sink 105 may include logic that receives one or more signals and stores the signals to memory and/or makes the signals available to another type of logic, such as another model, another device, etc.

In the embodiment of FIG. 1, sum block 101, gain block 102, sine block 103, constant block 104 and output 105 may operate on signals having one or more dimensions. For example, sine block 103 may generate a signal represented by a 3×3 matrix, as denoted by [3×3] at the output of sine block 103. In another embodiment, blocks may operate with vectors having a dimension of 1×n. In the embodiment of FIG. 1, blocks that are downstream in connectivity from another block may inherit characteristics from the upstream block. It should be appreciated that characteristics may be inherited in any direction of connectivity—constraints may be defined for one element, fed to other elements, and these constraints may be solved for a designed system. According to one embodiment, constraints may be determined for elements of a designed system and solved based on the element connectivity within the designed system.

For example, sum block 101 may inherit characteristics, such as a data size from sine wave block 103 and/or constant block 104. By way of example, sum block 101 inherits its data size ([3×3]) from sine wave block 103 and constant block 104, which both yield 3×3 outputs that are processed by sum block 101. Further, sum block 101 yields an output (also with a dimension of [3×3]) that is provided as an input to gain block 102. In this example, gain block 102 can inherit its data size from sum block 101, which is upstream from gain block 102. In another embodiment, gain block 102 can inherit its signal dimensions from other blocks in the model, such as sine wave block 103, etc. Output 105 (Out1) may inherit its size from gain block 102.

Figure 2:
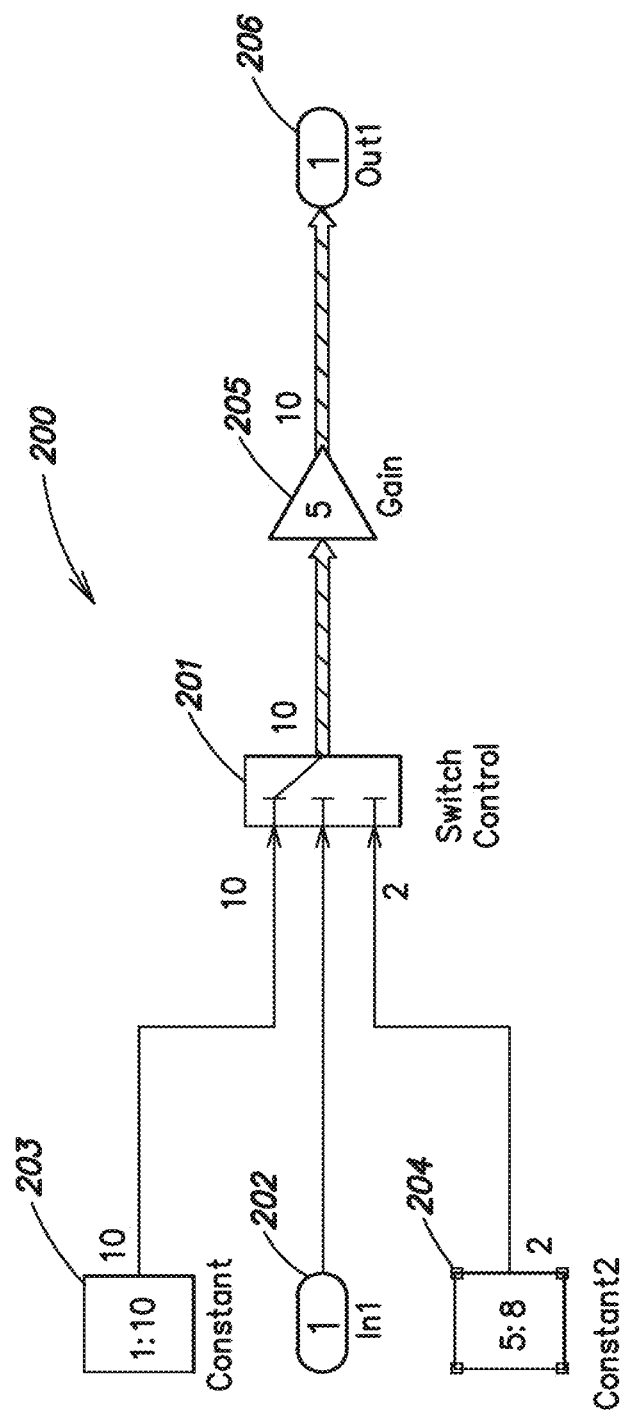
FIG. 2 shows a conventional technique for varying signal sizes that change in synchrony with a control signal.

Conventional block diagram programming implementations may allow dimension attributes of a signal to vary at run-time. For example, a dimension attribute may vary at every time instant with the values of the signal. FIG. 2 includes one example system 200 showing an effect of varying signal sizes or "variable sizing" during runtime.

System 200 includes a switch control 201 block that includes logic that switches an input signal to an output port responsive to an input signal In1 202. As shown in FIG. 2, switch control 201 accepts input signals Constant 203 and Constant2 204 and provides either signal as an input to gain block 205 depending on the value of signal 202. Gain block 205 may include logic that amplifies a received signal by a gain value to yield an amplified output signal similar to gain block 102. Further, the output of gain block 205 is provided as an output signal Out1 206.

Thus, system 200 yields an output signal dimension that is dependent upon a control signal. In particular, output signal dimension of switch control block 201 has a dimension of either [10] or [2] based upon whether a control signal value provided at input port In1 202 has a value of 0 or 1. In this form of variable sizing, signal sizes vary in synchrony with the values of the signal. For example, in FIG. 2, the signal size provided at the output of switch control 201 (either dimension [2] or [10]) is modified synchronously with the value of the control signal provided at input port In1 202.

Figure 3:
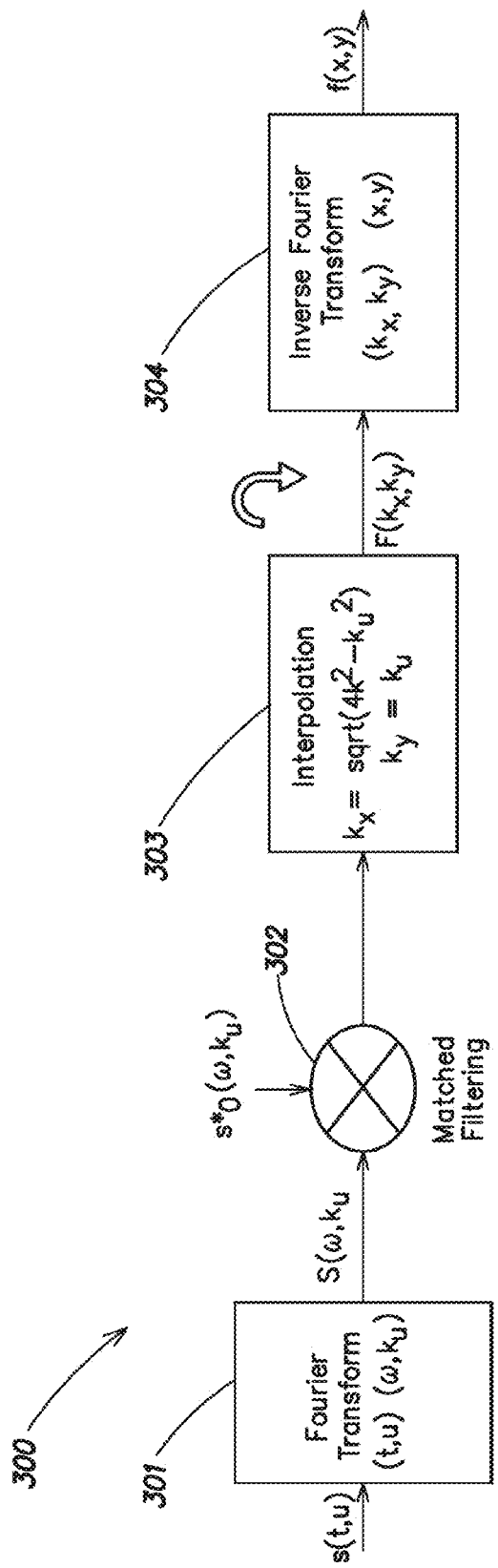
FIG. 3 shows one application that may be modeled using an exemplary embodiment.

FIG. 3 shows an illustrative example application in the radar signal processing domain in which various aspects may be implemented. In FIG. 3, attributes of signals, e.g., signal dimensions, may need to be varied at run time at distinct points in the execution of the block diagram. These signal dimensions may be varied asynchronously with respect to values of the signal. For example, one type of asynchronous signal dimension variation may occur when signal dimensions are varied at distinct mode-switching events.

FIG. 3 shows an image formation section 300 of a synthetic aperture radar (SAR) system that is used to perform post-processing of radar signals using Fourier transform techniques. In one example, section 300 takes raw radar signal data and yields image data. Section 300 may include a Fourier Transform block 301 that includes logic that performs a Fast Fourier Transform (FFT) of an input signal s(t,u). An output of FFT block 301 is provided as an input to a matched filter block 302 that includes filter logic that performs filtering of the FFT output. The filtered output may be provided as an input to an interpolation block 303, an output of which may be provided to a block 304 that includes logic capable of performing an inverse fast Fourier Transform (IFFT) on the input signal.

According to one embodiment, input signal sizes in this system s(t,u) may be varied in distinct steps (e.g., 128 time points, 256 time points, etc.) to account for changes in radar resolution. Such changes in resolution may happen upon mode-switching events in the system. Changes in signal sizes need to be propagated from the input to FFT 301, matched filter block 302, interpolation block 303, and IFFT block 304. In this example shown in FIG. 3, when the sizes of signals change because of a mode switch, all states in the subsystem may be reinitialized. Although the functions shown in FIG. 3 are provided by way of example, such functions may be any type of function having any degree of complexity.

Figure 4:
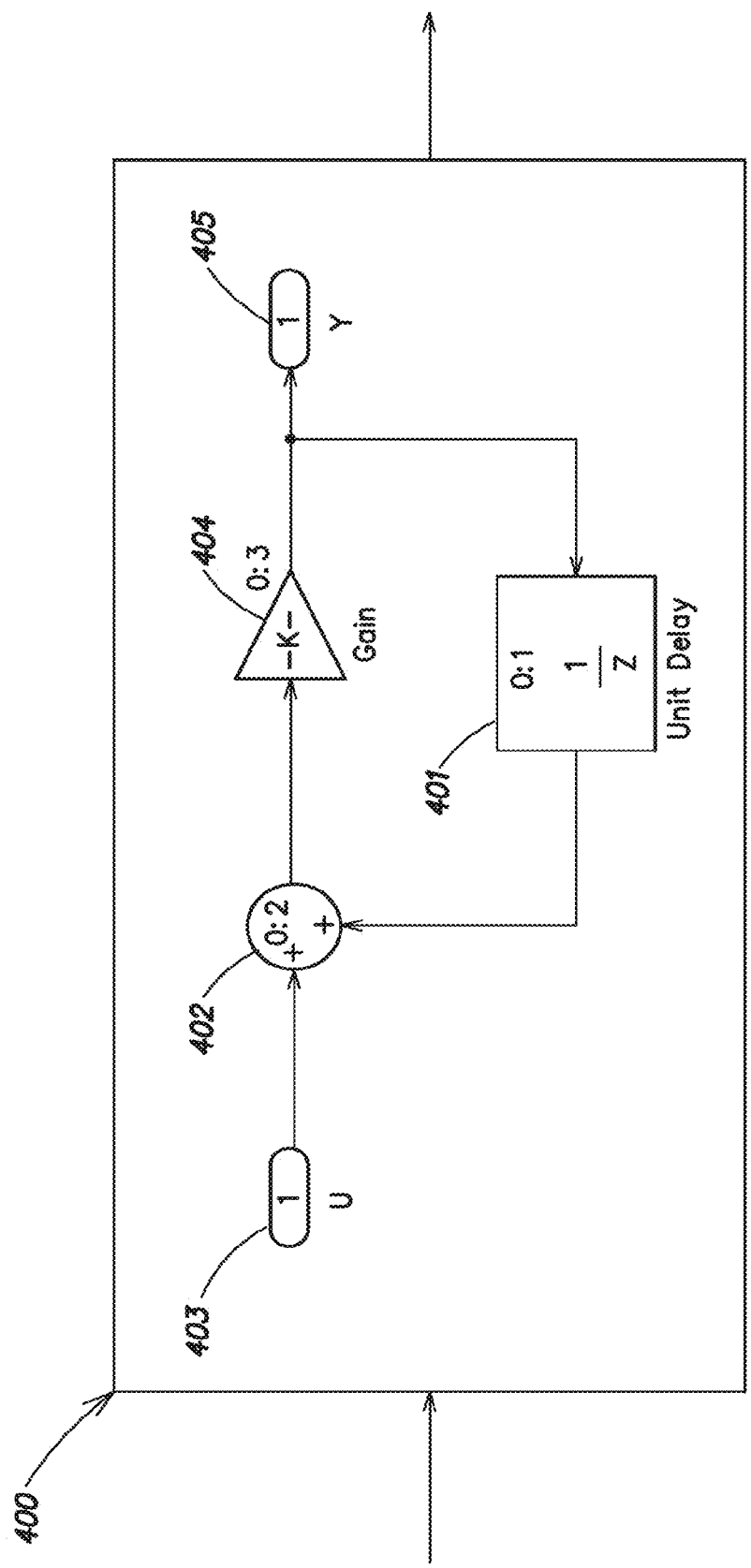
FIG. 4 shows an example system that exhibits shortcomings of conventional modeling systems.

In one embodiment, varying dimensions in synchrony with values of signals may be insufficient to solve certain problems, such as problems involving changes to attributes such as dimensions at distinct mode-switching events. This problem is illustrated in more detail in the example shown in FIG. 4. An example system 400 includes an input u (403), a delay block 401, a sum block 402, gain block 404, and output y (405). Unit delay block 401 may include logic that yields a one-step delay from input to output. Unit delay block 401 may be configured in a feedback path and provide an input to sum block 402. Gain block 404 may take an output signal of sum block 402 and may amplify the output signal by a gain value to yield an amplified output signal. This amplified output signal may be provided as an output y (405), and also may be provided as an input to unit delay block 401 in the feedback path.

System 400 may be executed in graphical programming environments by determining that, for example, delay block 401 can yield output values at any given time independent of an input. Therefore, the output of delay block 401 can be computed first, followed by the output of sum block 402.

Now consider the case where input signal u (item 403) of system 400 changes its dimensions to a new value. If signal dimensions are allowed to change only synchronously with the signal values, the output of delay block 401 may need to be computed at a time when its input dimensions (which are the same as the output dimensions of sum block 402) have not yet been set to the new value. This is problematic, as an error may occur if the dimensions of the inputs of sum block 402 do not match, and block 402 does not have the capability of processing the mismatched inputs. This same problem extends to many different block types. For example, this problem applies to block types having states stored inside of them (e.g., filter blocks).

Figure 5A:
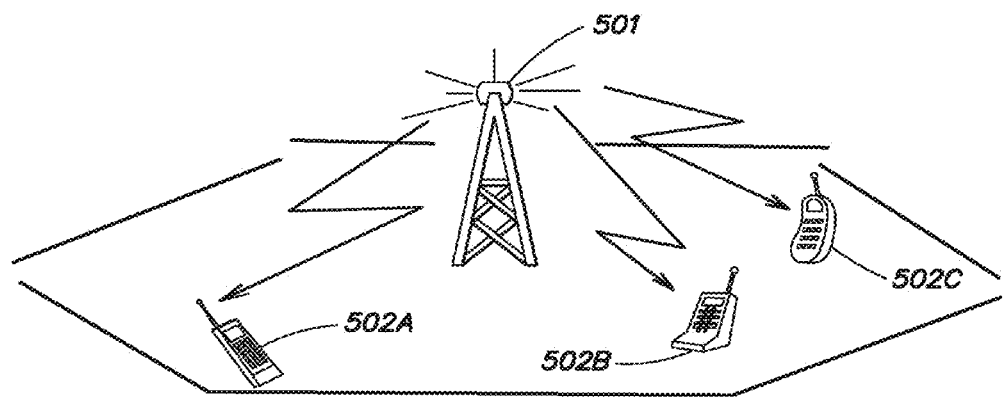
FIG. 5A shows one example system in which various aspects may be practiced.
Figure 5B:
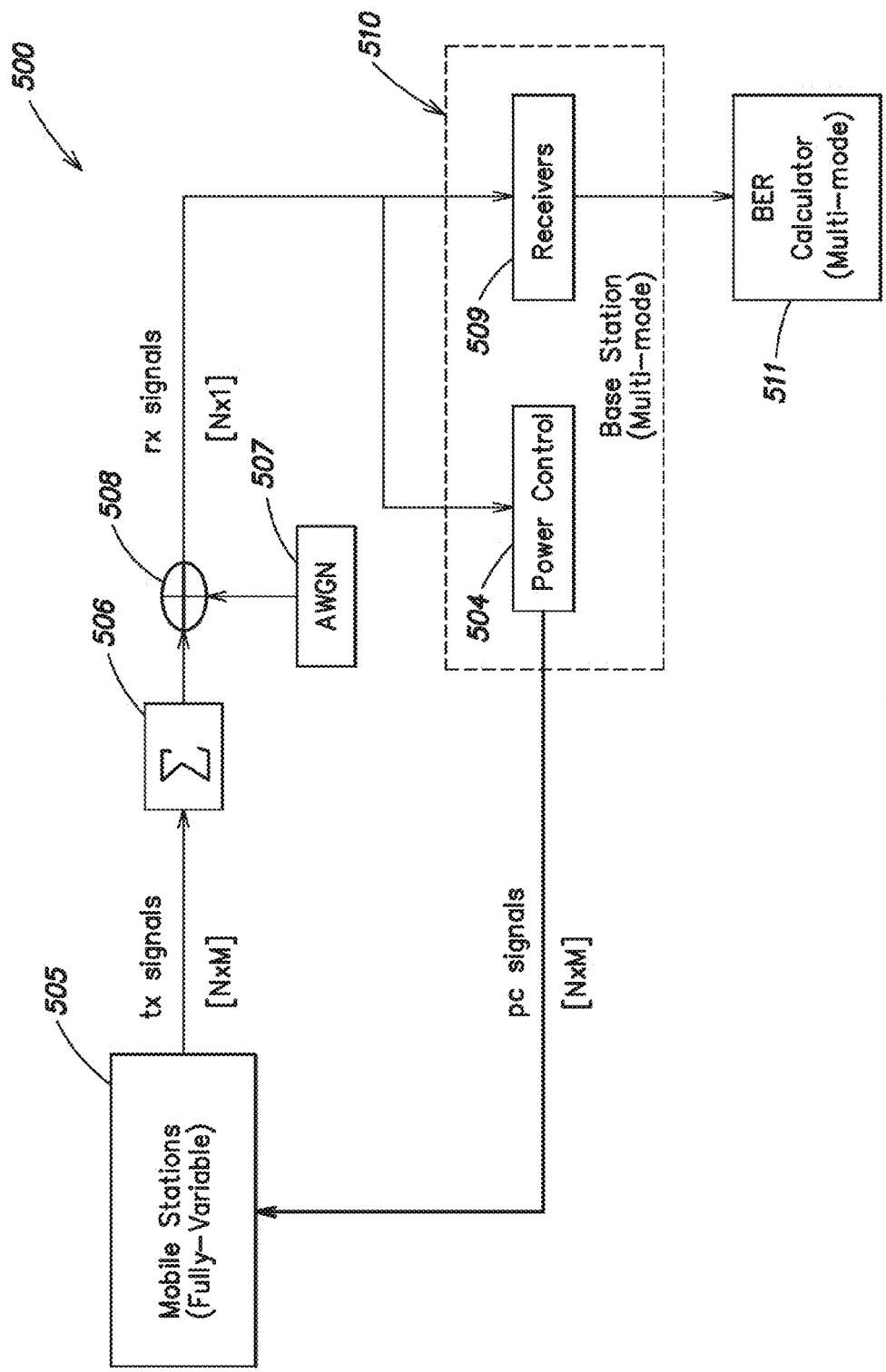
FIG. 5B shows an example block diagram implementation of the system shown in FIG. 5A.

In some applications, it may be desirable to use signals whose sizes synchronously change with their values along with signals whose sizes change on distinct mode-switching events. FIGS. 5A-5B show an example application that demonstrates a modeling problem that can arise in the wireless communications area. In particular, FIG. 5A shows a communication system having a base station 501 that communicates with one or more transmitters/receivers 502A-502C. Wireless communication systems such as cellular telephone systems may have such a communication system configuration. In the example shown, such a system may include a cell tower that communicates with one or more cellular phones that transmit and receive information to/from the cell tower.

In such communication system types, transmitters/receivers are added and subtracted from the system as these transmitters/receivers are turned on/off, enter/leave from the transmission area, or travel to various locations within the transmission area. One problem with maintaining communication in such a communication system includes determining a communication solution that ensures diversity among the transmitters/receivers such that as transmitters/receivers are added, communication parameters are adjusted to minimize interference between the transmitters/receivers. To solve this problem, transmitter power control algorithms may be provided to allow transmitters/receivers to dynamically share bandwidth of a wireless channel, optimizing the channel throughput.

FIG. 5B shows a block diagram of a system 500 that computes the power control strategy for a communication system such as that shown in FIG. 5A. Similar to other block diagram models, system 500 may include blocks having logic that perform various functions. System 500 includes a block 505 that represents one or more mobile stations that yield transmission signals [N×M]. Such signals are added via a summation block 506, and are added to an additive white Gaussian noise channel model block 507 output via a sum block 508. An output of sum block 508 is provided to receivers block 509 of a base station 510 (e.g., of base station 501) to receive and process the received signal. Also, such a received signal is provided to a power control block 504 that determines a power control strategy based on the received signal.

As shown in FIG. 5B, a closed-loop power-control strategy implemented in the communications base-station 501 is varied at distinct points in time rather than at all times. In particular, base-station 501 feeds back information to the transmitters/receivers (e.g., transmitters/receivers 502A-502C of FIG. 5A), to permit the transmitters/receivers to transmit at the proper frequencies/power scenarios to ensure signal diversity. System 500 may also include a bit error rate calculator 511 that determines error rates within the received signal.

Although the transmission solution is computed at distinct points, the number of wireless transmitters/receivers (e.g., transmitters/receivers 502A-502C) may change periodically over time. Mode1 500 includes signals representing transmitters/receivers (e.g., transmitters/receivers 502A-502C) whose sizes change constantly in synchrony with the signal values. Such signal values, may be, for example, signals transmitted by transmitters/receivers 502A-502C of FIG. 5A. In contrast, power-control subsystem 504 in base station 501 may use signals whose sizes change at distinct points in time where the number of current transmitters is sampled and held for the duration of time over which that power-control strategy is in effect. That is, for a particular time interval, the power control strategy is maintained, although transmitters/receivers may appear or disappear over time during any period the power control strategy is operating.

In the example of FIGS. 5A and 5B other signal attributes such as data types may also need to be varied at mode switching events. For instance, in the communication example above, different communication protocols may be associated with different modes, and various receivers may use different protocols depending on their mode. Other system examples may be used wherein other attributes may be varied responsive to mode switching event. In another example using a control system involving one or more sensor inputs, the same control strategy may need to be exercised with different data types at run-time based on switching to different precisions of sensor inputs.

EXAMPLE IMPLEMENTATION

In one example implementation a mode-switched variable signal sizing block diagram environment may be implemented using the Simulink® software product provided by The MathWorks Inc. of Natick, Mass. According to one embodiment, a block may be provided that is designed to support mode-switched variable size computation.

Figure 6A:
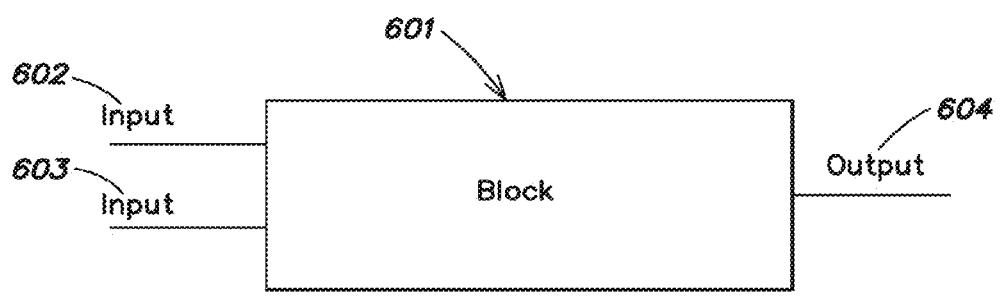
FIG. 6A shows an example block implementing various aspects of propagating parameters in a modeled system.

FIG. 6A shows one example block that is capable of performing mode-switched computation according to one embodiment. In particular, FIG. 6A shows a block 601 that includes code that is responsive to a mode switching event. According to one embodiment, the block (or other type of graphical modeling construct) includes code that is capable of being executed by a system, permitting that system to be responsive to a mode switching event. Such code may be simulated or otherwise executed (e.g., by a simulation engine, device, etc.), to respond to the mode switching event and modify the execution behavior of one or more blocks.

Block 601 may include one or more inputs (e.g., inputs 602, 603) and may include one or more outputs (e.g., output 604). In one exemplary embodiment, block 601 may compute a sum of signal inputs 602 and 603, and yield a corresponding output 604 that represents the sum of the signal inputs 602 and 603. In another embodiment, block 601 may implement other types of functions. For instance, block 601 may implement a concatenate function that concatenates multiple input vectors into a single output vector. Also, blocks supporting mode-switched functions may have more or fewer inputs and/or outputs.

Block 601 may be configured to provide several types of information to the block-diagram modeling environment. For instance, block 601 may provide:

(1) A flag indicating a readiness of block 601 to support mode-switched variable size signals Such a flag may be made available to another block, device, simulation engine, or subsystem to determine whether block 601 supports mode-switched variable size signals.

(2) A map that defines a set of dependency constraints on which input port dimensions are needed for setting respective ones of its output port dimensions. In another embodiment, an output port dimension can be used to set an input port dimension. According to one embodiment, more than one constraint set may be specified for one output port of a block. Such a map may reside in the block (e.g., block 601) or may be defined elsewhere, such as in an external block or subsystem, in a map associated with a block diagram, or in any other location.

(3) A new method defined for a block, called during runtime, that sets the sizes of each of the block's output ports based on one of the dependency constraints chosen by the simulation engine from among the constraints provided by the block in (2).

Two code examples below demonstrate how a block (e.g., block 601) can specify its mode-switched variable size behavior. The first example involves a 2-input sum block (e.g., block 601) that may be used in a graphical programming environment (e.g., within an environment provided by the Simulink® software product). In one embodiment, the block may use a technique to indicate its readiness to handle mode-switched variable-size signals. For example, in one embodiment, the block may set a flag to indicate its readiness to handle mode-switched variable-size signals. This flag may also be used to identify whether the block is capable of handling mode-switched operation.

According to one embodiment, the block may also provide the following map in a suitable data-structure (e.g., a data structure internal to the block or external to the block):

Constraint1: Sizes of Output1 of sum can be computed using sizes from input 1

Constraint2: Sizes of Output1 of sum can be computed using sizes from input 2 The block may have any number of constraints that define what relationship(s) need to be satisfied.

Further, according to one embodiment, the block may have associated with it code that implements a behavior resulting from a mode-switching event. For example, the code, when executed, may perform an attribute setting function based on a mode-switching event. In one example, the sum block may register a function with a simulation engine (e.g., a simulation engine of the Simulink® software product) of the form:

```
void SumSetOutputSizes(BlockHandle bh, int constraintIdx)
{
    if (constraintIdx == 1) {
        bh->setOutputSizes(1, bh->inputSizes(1));// Copy sizes from
                                                  // inp 1 to output 1
    } else {
        Assert(constraintIdx == 2);
        bh->setOutputSizes(1, bh->inputSizes(2));// Copy sizes from
                                                  // inp 2 to output 1
    }
}
```

In the example code above, the output port size dimension (e.g., of output port 604) is changed to the dimension of either of the input ports (e.g., input ports 602, 603) of the sum block. The simulation engine may call the above method with either constraint index based upon a propagation sequence.

As discussed, although such mode switching may be performed with a sum block, other functions may be performed by block 601 that are responsive to mode-switching events. The second example illustrates block 601 performing a different function, namely a 2-input vector concatenation. In one embodiment, the block concatenates two input vectors into a single output vector. As discussed above with respect to the 2-port sum block example, the 2-input vector concatenate block may be programmed to set a flag indicating its readiness to handle mode-switched variable-size signals. According to one embodiment, the 2-input concatenate block may then provide the following map in a suitable data-structure:

Constraint1: Sizes of Output1 of Concatenate can be computed using sizes from inputs 1 and 2

That is, the constraint indicates that the size dimension may be determined based on both of the available inputs to the concatenate block.

Finally, the concatenate block may register a function with the simulation engine of the form:

```
void ConcatSetOutputSizes(BlockHandle bh, int constraintIdx)
{
    assert(constraintIdx == 1);
    // Set output size to be sum of input sizes
    bh->setOutputSizes(1, bh->inputSizes(1) + bh->inputSizes(2));
    // '+' operator
                                    // overloaded to add
                                    // sizes of all
                                    dimensions
}
```

Figure 6B:
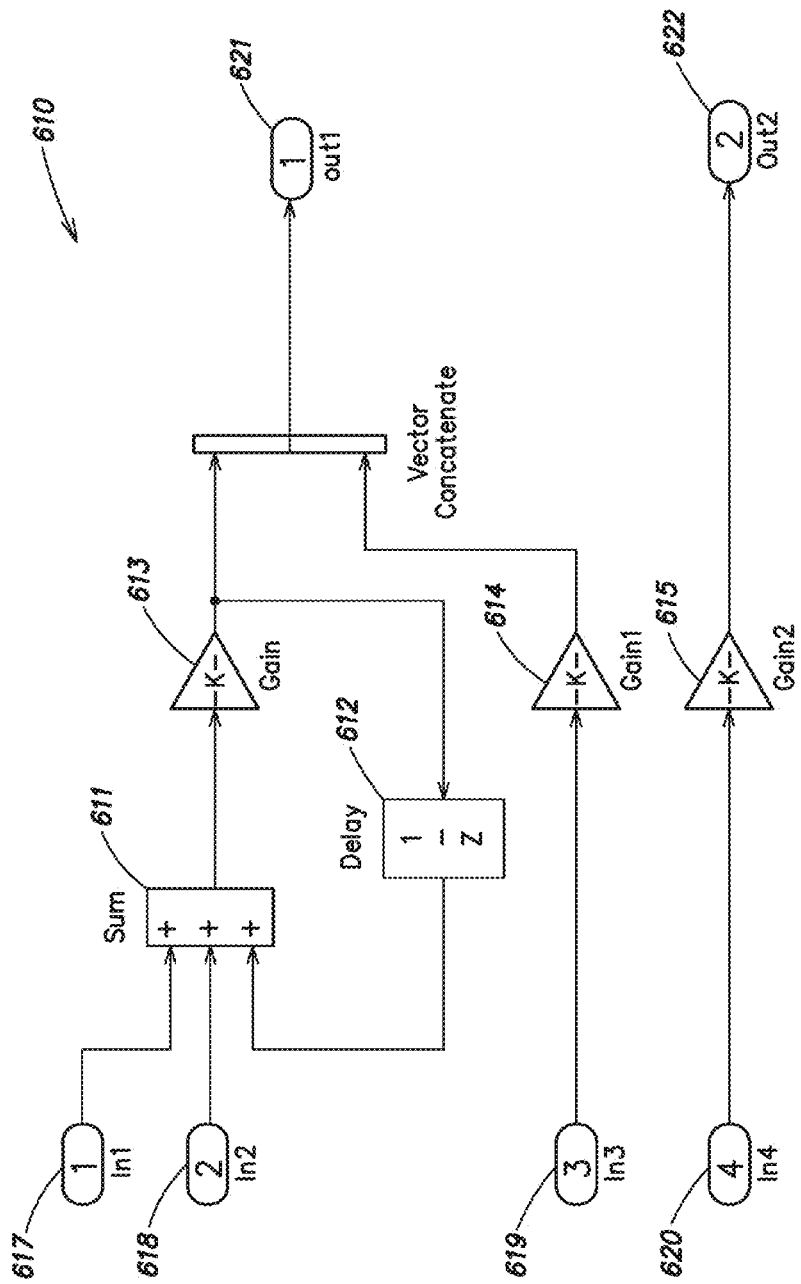
FIG. 6B shows an example subsystem implementing various aspects of propagating parameters in a modeled system.

As discussed above, graphical models (e.g., a block diagram model) may include a number of blocks that operate in different ways. In some embodiments, it may be desirable to arrange the blocks based on functionality or other characteristics. One way to arrange the blocks based on functionality or characteristics is via subsystems. In another embodiment, subsystems (or portions thereof) may also be adapted to support mode-switched processing. FIG. 6B shows an example subsystem 610 that may be used to practice various embodiments.

According to one embodiment, it may be useful to identify subsystems that are capable of supporting mode-switched variable signal sizes. Indicators may be used to demarcate regions of the block-diagram (e.g., a subsystem) where mode-switched variable size signals are supported. Regions may be demarcated, for example, using graphical indications, colors, or other indicator types.

A subsystem 610 that supports mode-switched processing may include one or more blocks, each having one or more inputs and outputs. Subsystem 610 may include, for example, a sum block 611, gain block 613, delay block 612, gain blocks 614, 615 and a vector concatenate block 616. Sum block 611 is a three-port sum block that includes logic that yields an output sum of the three input signals. A vector concatenate block includes logic that concatenates signals provided at its inputs to create a contiguous output signal.

Further, subsystem 610 may include one or more inputs such as inputs In1-In4 (elements 617-620). Subsystem 610 may also include one or more outputs such as, for example, Out1-Out2 (elements 621-622). These blocks, inputs and outputs may be connected in various ways via interconnecting signal lines, including the example arrangement shown in FIG. 6B. According to one embodiment, one or more blocks in FIG. 6B may be adapted to perform mode-switched processing. For instance, sum block 611 could be adapted to support mode-switched processing as discussed above with respect to the example code.

According to one embodiment, subsystem 610 may be configured to process variable size signals and to respond to one or more mode switching events. For instance, an event may be triggered that causes a mode switch to be performed during processing of subsystem 610, after which attributes are propagated among elements of subsystem 610.

In one example implementation, subsystems represented by blocks may include a flag that indicates that blocks in the subsystem are expected to support mode-switched variable size signals. In an embodiment, this flag can be provided as a widget on the block parameters dialog for the subsystem. In another example, the flag indicator may be implemented as any control or setting associated with the block. In one embodiment, setting a flag for the subsystem may identify that all blocks within the subsystem are capable of supporting mode-switched variable size signals. Such a flag may be used, at initialization of the system, to define the behavior supported by the subsystem and its corresponding blocks.

For signal attributes such as dimensions, specialized propagation code may be generated and provided with the executable code that allows for a mode switch to be performed. Thereafter, a corresponding attribute may be propagated in the deployed application, when executed (e.g., by a general-purpose computer system). In one example implementation, attributes can be determined before execution based on possible mode change event that may occur during execution. In such a case, executable code need not include propagation functionality.

For an exemplary subsystem that has been setup to perform processing of mode-switched variable size signals, the simulation engine may be configured to perform three analysis passes. The first analysis pass may use the constraint map described above that is provided within each block to determine the constraint map for the subsystem as a whole. In an embodiment, this process may be performed recursively starting with hierarchically lowest subsystems (e.g., subsystems that do not themselves contain other subsystems) first. This type of analysis pass is illustrated in the example of FIG. 6B as discussed further below.

In the example of FIG. 6B, the constraint map for subsystem 610 may be defined as:

Constraint1: Sizes of Out1 of subsystem 610 can be computed using sizes of In1 and In3

Constraint2: Sizes of Out1 of subsystem 610 can be computed using sizes of In2 and In3

Constraint3: Sizes of Out2 of subsystem 610 can be computed using sizes of In4

This constraint map may be derived from the constraint maps of blocks in the Subsystem 610 (e.g., blocks 611, 616, etc.). Constraint maps can define conditions that determine output port dimensions for these blocks, and/or other attributes that can change in response to a mode switching event.

According to one embodiment, the second analysis pass may define a SetOutputSizes function (as described for each individual block above) for subsystem 610 as a whole. Given one of the constraints from the constraint map for subsystem 610, this method may set the output port sizes of subsystem 610 given the input port sizes that are identified as available by that constraint. This technique allows subsystem 610 to be hierarchically subsumed by other subsystems, and therefore, blocks responsive to mode events may be hierarchically arranged and the resultant hierarchy may be responsive to mode changes. For the example above, this method may be defined as follows and may be embedded in generated code:

```
void SetOutputSizes(BlockHandle bh, int constraintIdx)
{
    if (constraintIdx == 1) {
        bh->setOutputSizes(1, bh->getInputSizes(1) +
            bh->getInputSizes(3));
    } else if (constraintIdx == 2) {
        bh->setOutputSizes(1, bh->getInputSizes(2) +
            bh->getInputSizes(3));
    } else {
        assert(constraintIdx == 3);
        bh->setOutputSizes(2, bh->getInputSizes(4));
    }
}
```

Thus, additional code may be provided with subsystem 610 to handle setting of output port sizes based on available input parameters.

According to one embodiment, a third analysis pass may determine one propagation sequence for sizes within a subsystem marked as supporting variable size signals. For example, this pass may involve a simple depth first traversal of all blocks inside a given subsystem. In one embodiment, the pass may traverse all blocks starting at the subsystem inputs and using information about block connectivity (e.g., by following block connectivity from inputs to outputs, or other scheme). According to one aspect, it is appreciated that this sequence may be used both in simulation and in the generated code to propagate all of the sizes within the subsystem when input sizes change in response to a mode switch event. For the example above with respect to FIG. 6B, one potential sequence for propagating sizes given new input sizes may include the following sequences:

sum block 611
gain block 613
delay block 612
gain block 614
vector concatenate block 616
gain block 615

A further refinement to the above procedure may involve using the results of the propagation pass in the third analysis phase above to perform optimizations on the SetOutputSizes function derived in the second analysis pass. For instance, if only a subset of constraints in the constraint map of a subsystem are exercised in a given model, then the unused constraints for that subsystem can be optimized away leading to a simpler SetOutputSizes function for subsystem 610.

During simulation or otherwise during any other execution of generated code, an event may be triggered that causes the sizes at the input of the subsystem (e.g., subsystem 610) to change. At this point, the sizes may be repropagated through the subsystem using the propagation sequence obtained in the third analysis pass described above. During the propagation, a block's SetOutputSizes function (the third piece of information specified by each block as described above) may be called to help propagate its sizes from its input to output or alternatively from its output to its input.

Similarly, when code is generated for a subsystem, methods such as the SetOutputSizes functions as discussed above may be embedded into the generated code in accordance with the sequence defined by the third analysis pass. This code may be invoked when the subsystem's sizes are changed in response to an event.

Events that cause propagation of attributes may include explicit signaling events such as those involving conditional subsystems. For instance, a subsystem that evaluates a condition and performs a function as a result may be used to signal a mode change event. For instance, a subsystem having logic that implements a case switch function, do while loop function, if else function or any other function whose execution depends upon one or more parameters (e.g., an input signal). In another example, an event could be generated from a block in a block diagram where the block behavior is specified or implemented in a textual language, such as, for example, MATLAB or embedded MATLAB, a mathematical script, etc. In another implementation, a mode switching event can include the occurrence of an exceptional or error condition, and attributes may be determined based on the occurrence of a particular exceptional or error condition.

According to one embodiment, a mode switching event can be generated by a number of different entities, including, but not limited to a user, an operating system, an entity external to the system (e.g., a data acquisition system, hardware, software, or combination thereof), or other entity. Further, a mode switching event may be generated in a concurrent execution, for example, in a different task, process, or thread. Also, a mode switching event can be generated, for example, in a different simulation loop, by the operating system (for example, as part of an interrupt service routine), or can be based on user input.

Further, events may be non-hierarchical (e.g., not generated by a block in the hierarchy) such as a broadcast event received from a modeling environment such as one generated by other programming environments (e.g., SimEvents® or Stateflow® environments of the Simulink® software product). Events may also be implicitly generated by changes in signal attributes to demarcated regions indicated as one that propagates attributes. For instance, an implicit change in input signal parameters (e.g., size of the input parameter) may trigger a mode change event that can be propagated to other elements, blocks, subsystems, etc.

Mode change events that trigger a repropagation of signal sizes in a software package (e.g., the Simulink® software product) could be explicit or implicit mode change events. Explicit events may include those modeled by the user using conditional subsystems (e.g., as defined in the Simulink® software product) or through the use of state-transition diagrams (e.g., in the Stateflow® software product). For instance, a size repropagation can be triggered when a conditional subsystem such as an enabled subsystem or function-call subsystem becomes re-enabled.

Figure 7:
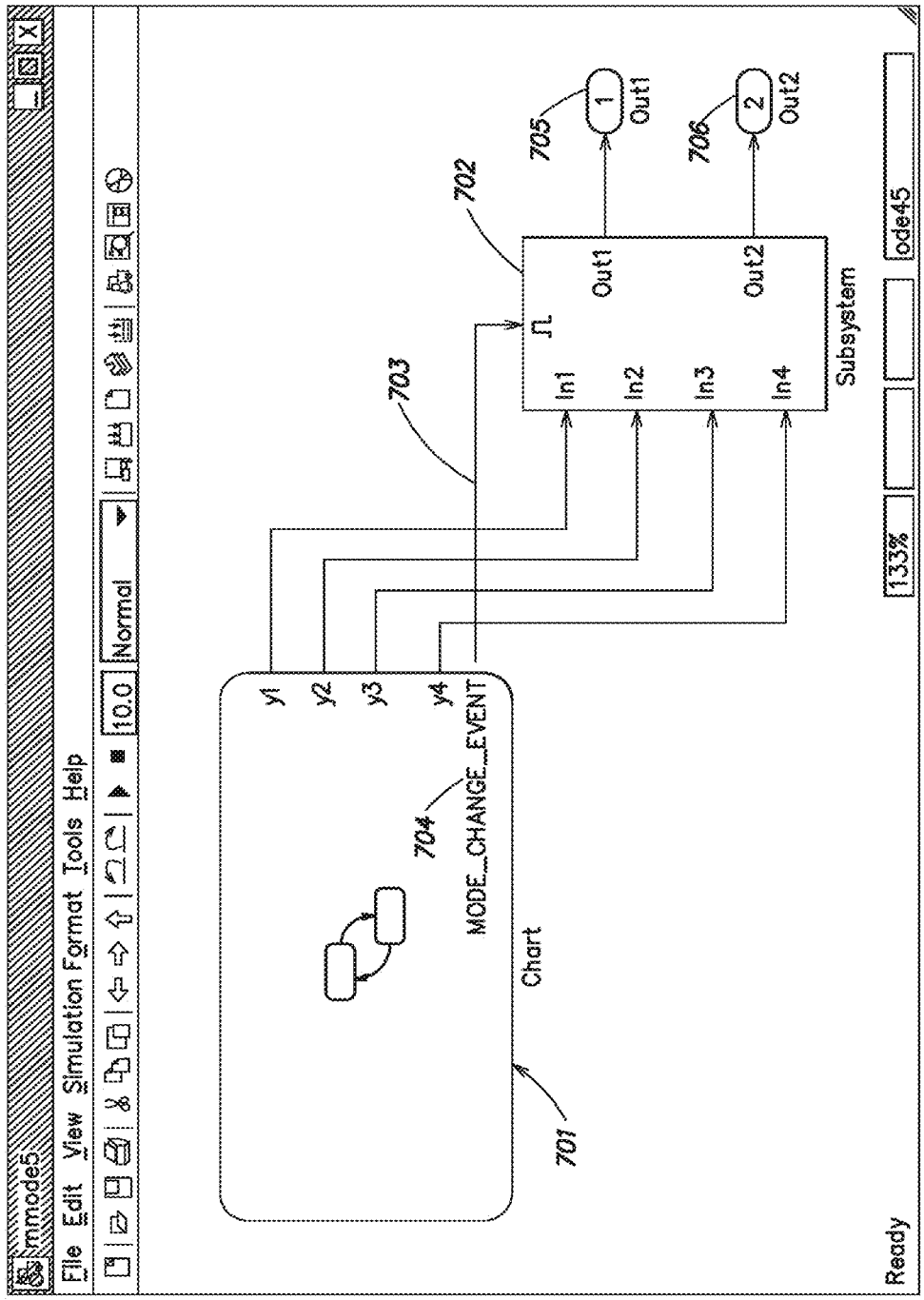
FIG. 7 shows an example subsystem that is responsive to mode change events.

One way to manage a mode change event in a graphical form may include using a state chart (e.g., a Stateflow® chart as provided in the Stateflow® software product). Consider the system shown in FIG. 7, and its corresponding state chart shown in FIG. 8. In the example shown in FIG. 7, chart 701 may send a mode change event to subsystem 702. In particular, FIG. 7 shows a display of a chart 701 that provides mode change control input 703 to a subsystem 702 which can pass a value of a to MODE_CHANGE_EVENT signal 704. Subsystem 702 may be, for example, similar to the subsystem 610 as shown in FIG. 6B.

In addition to control input 703, chart 701 may provide a number of outputs (y1, y2, y3, y4) to subsystem 702 as inputs (In1, In2, In3, In4). For instance, inputs In1, In2, In3, and In4 may correspond to inputs 617-620 of subsystem 601. Further, subsystem 702 may include one or more outputs (e.g., Out1 705, Out2 706) that provide one or more output signals, respectively. These may correspond to the outputs 621, 622 of subsystem 601.

Figure 8:
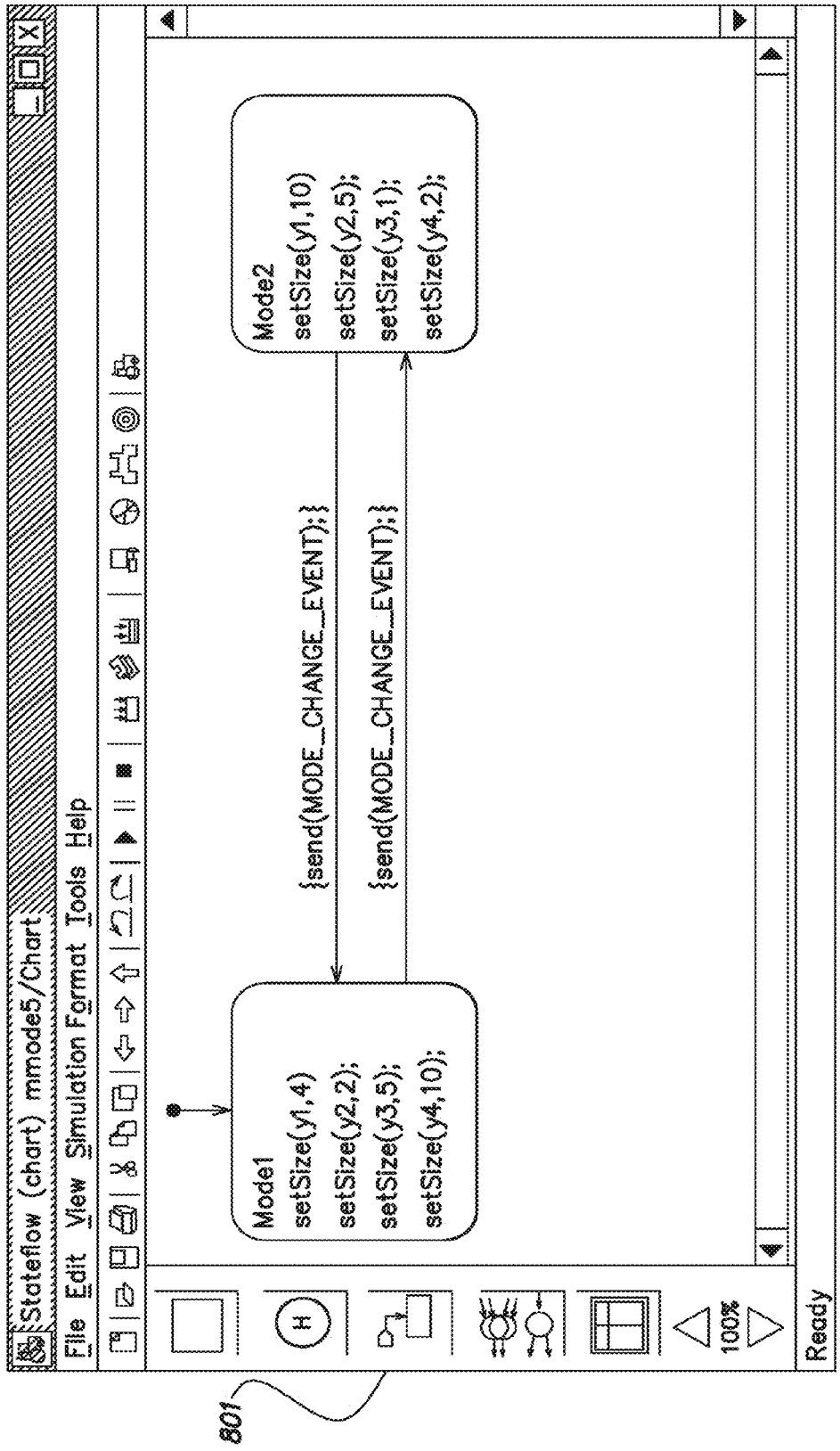
FIG. 8 shows an example state diagram that includes a state model that changes modes in response to mode change events.

As shown in FIG. 8, a state chart 801 may be provided that indicates that a subsystem (e.g., subsystem 702) operates in one of two modes. In the example shown, these modes are referred to as Mode1 and Mode2. Chart 701 sends a "mode change event" to subsystem 702 to initiate a transition from Mode1 to Mode2. According to one embodiment, the Mode1 and Mode2 modes may use functional-form operators to set the sizes of the output data of the chart which are connected to subsystem 702. Thus, the sizes of the output data may depend on the mode change triggered by a chart (e.g., chart 801). More particularly, when the state transition takes place from Mode1 to Mode2 or vice versa, chart 801 may be responsible for triggering a mode change event to a subsystem (e.g., subsystem 702) which re-propagates the data sizes, sample times etc. or other attributes at the time of the event occurrence.

While this example shows chart 701 setting sizes of outputs to constant values, it is possible for the functional form operators (e.g., operator setSize( ) as shown in FIG. 8) to accept expressions evaluated at runtime or before runtime with results stored to be used during runtime for setting the sizes. In addition, chart 701 can also set the types and sample times of the outputs via one or more functional form operators (e.g., operators such as setSampleTime( ) and setType( ). Thus, a capability may be provided to permit users to "explicitly" trigger the mode changing based on runtime protocols using state diagrams in conjunction with a graphical programming environment.

Implicit mode change events may be triggered, for example, when sizes of signals feeding a mode-switched variable sizing subsystem may be exchanged at run-time. Such a size change may be automatically detected by the subsystem which in turn may initiate a size repropagation and a state reset. This implicit detection of mode change could be added, for instance, to any class of subsystems in the Simulink® software product or any other programming environment.

Although various embodiments may relate to propagating signal dimensions, it should be appreciated that other attributes may be propagated to other elements in response to an event. For instance, any signal attribute may be propagated, such as a data type of the signal being processed, a change in signal complexity, and sampling times used for processing a signal, among other attributes.

Further, although many of the examples described above may relate to the Simulink® software product, it should be appreciated that aspects may be applied to other block-diagram modeling paradigms such as state transition diagrams, discrete event modeling, and dataflow modeling. This is because the notion of attribute propagation in response to a mode-switching events remains unchanged by the specific execution semantics of a specific block-diagram modeling paradigm.

Figure 9:
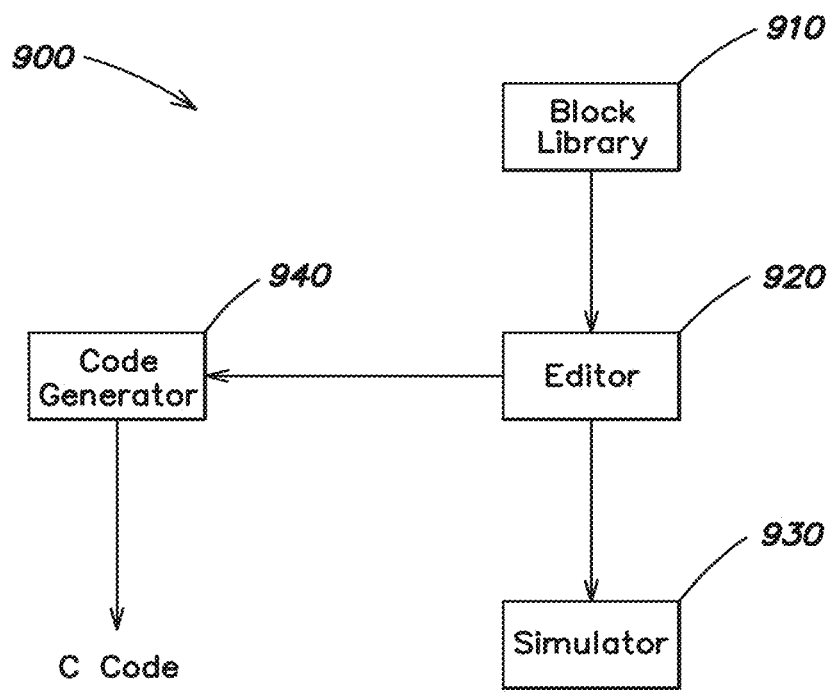
FIG. 9 shows an example graphical programming environment in which various aspects may be practiced.

However, according to one embodiment, various aspects may be implemented in a graphical programming environment that uses blocks to represent models. FIG. 9 shows an exemplary graphical programming environment in which blocks may be utilized to represent models according to one embodiment. Environment 900 includes a block library block 910, an editor 920, a simulator 930 and a code generator 940. Editor 920 and simulator 930 may provide a graphical simulation and prototyping environment for modeling, simulating, and analyzing systems. Editor 920 may incorporate blocks provided from block library 910 into systems to be designed by users. Systems designed in editor 920 may be simulated by simulator 930 to analyze the behavior of the designed systems. Exemplary editor 920 and simulator 930 may be found, for example, in the Simulink® software product.

As discussed, the block diagram programming environment enables one or more users to design a block diagram corresponding to a modeled system, simulate the system's behavior, analyze the performance of the system, and refine the design of the system. The environment may also allow users to design systems through a user-interface that allows drafting of block diagram models of the systems. Predefined blocks in block library 910 may be made available to users when the users are building the block diagram of the systems to allow such users to more easily design systems.

According to one embodiment, one or more block types in block library 910 may be responsive to mode change events. Also, users may be provided tools to modify behavior of custom block types the users have created so that such custom blocks are responsive to mode change events. In one implementation, a block may include logic that exhibits a change in execution behavior in response to a mode change event.

In one embodiment, the user may be provided an interface that selectively allows the user to define one or more functions or instructions that can be performed responsive to a mode change event. For instance, a user dialog may be provided that permits the user to select one or more predetermined functions that can be executed responsive to the mode change event. For example, the user dialog may permit a user to select an interpolation function, extrapolation function, first order hold function, zero padding function, reset values, or other function. In another embodiment, the user may be permitted to define their own function that can be used, for example, to compute output values and/or other attributes for a block responsive to the mode change event. This may be accomplished, for example, by permitting a user to define their own function, script, or procedure that could be executed.

Individual users may be able to customize model blocks to: (a) reorganize blocks in some custom format, (b) delete blocks they do not use, and (c) add custom blocks they have designed. The blocks may be dragged through some human-machine interface (such as a mouse or keyboard) from block library 910 on to a window (e.g., a model canvas). The block diagram programming environment may include a block diagram editor that allows users to perform such actions as draw, edit, annotate, save, and print out block diagram representations of systems.

The block diagram editor may be a graphical user interface (GUI) component that allows drafting of block diagram models by users. The block diagram programming environment may also provide a textual interface with a set of commands that allow interaction with the graphical editor. Using this textual interface, users may write special scripts that perform automatic editing operations on the block diagram. The environment may also allow users an ability to simulate the designed systems to determine the behavior of the systems. Further, the environment may include a block diagram execution engine that carries out the task of compiling and linking the block diagram to produce an "in-memory executable" version of the model that may be used for generating code and/or simulating a block diagram model.

A block diagram generally includes a class of modeling formalisms that connect entities by relations. Semantics of a block diagram syntax can be implemented to capture formalisms such as state transition diagrams, Petri nets, Kahn process networks, dataflow diagrams, sequence diagrams, Communicating Sequential Processes, and other syntactic and semantic models. The syntax of a block diagram may include any syntax type including, but not limited to, squares, rectangles, circles, ovals, icons, and user defined syntax. Further, a graphical model such as a block diagram may contain elements the behavior of which is completely or partially determined by a textual language. This language may be dynamically typed and it may be array based. Also, the blocks may be software components, objects in a service oriented architecture, hardware intellectual property (IP) blocks, etc.

Block library 910 contains blocks of application specific models that may support the modeling and simulation of systems. Blocks in the block library 910 may be incorporated into models of the systems designed using modeling and simulator 930. The blocks provided from the block library 910 may be represented generally by rectangular blocks according to one embodiment. However, other embodiments may represent elements within models using other techniques, such as graphical symbols and/or textual symbols.

The model blocks provided by the block library 910 may include a block processing block for selectively processing input data. According to one embodiment, block library 910 may include Simulink® software product Blocksets, such as DSP blockset, Fixed-point Blockset and Communications Blockset, commercially available from The MathWorks, Inc., Natick, Mass. The Simulink® software product Blocksets provide models and utilities for the development and integration of models for target systems and sub-systems of the target systems.

According to one embodiment, code generator 940 may be capable of generating source code for models that are responsive to mode change events. In one embodiment, code generator 940 generates customizable C-code directly from block diagrams of the models designed using editor 920. Although it should be appreciated that C-language code may be generated, it should be appreciated that any other type of code may be generated. For example, Hardware Descriptive Language (HDL), ADA, Java, JavaScript, Python, Erlang, or other code types may be generated that may be graphical (e.g., UML diagrams). Alternatively and in addition, library or object code could be directly generated or referenced. By automatically generating source code, code generator 940 may enable rapid prototyping, hardware-in-the loop simulations, and desktop rapid simulation on the models designed in the editor 920. Code generator 940 may generate efficient source code for embedded systems applications. It should be noted that source code in FIG. 9 is an illustrative code that may be generated in the code generator 940, and that the code generator 940 may generate different code for the models, such as Ada. Real-Time Workshop available commercially from The MathWorks, Inc., Natick, Mass., is one example code generation tool that may be used as code generator 940.

According to one embodiment, code generator 940 may be adapted to generate a minimized source code responsive to mode change events. In one embodiment, because additional code is provided that defines constraints that reconcile how attributes are changed during runtime, the code that models a system can be created more efficiently, as the code need not handle all conditions some of which may not necessarily occur. The smallest dimension of code may be determined, for example, through static or dynamic analysis (e.g., by executing a test suite).

One of skill in the art will appreciate that the graphical programming environment 900 is not limited to block diagram programming environments, but rather includes any other graphical programming environments, such as state flowchart graphical programming environments. For instance, the Stateflow® product, may provide a graphical environment for modeling and designing event-driven models. The Stateflow® product may enable users to generate state flowcharts that graphically represent hierarchical and parallel states and the event-driven transitions between the states of the models. The Simulink® software product, which may be interfaced with the Stateflow® product, may be used to execute the models and analyze the behavior of the models based on, for example, state flowcharts created by the Stateflow® product.

Figure 10A:
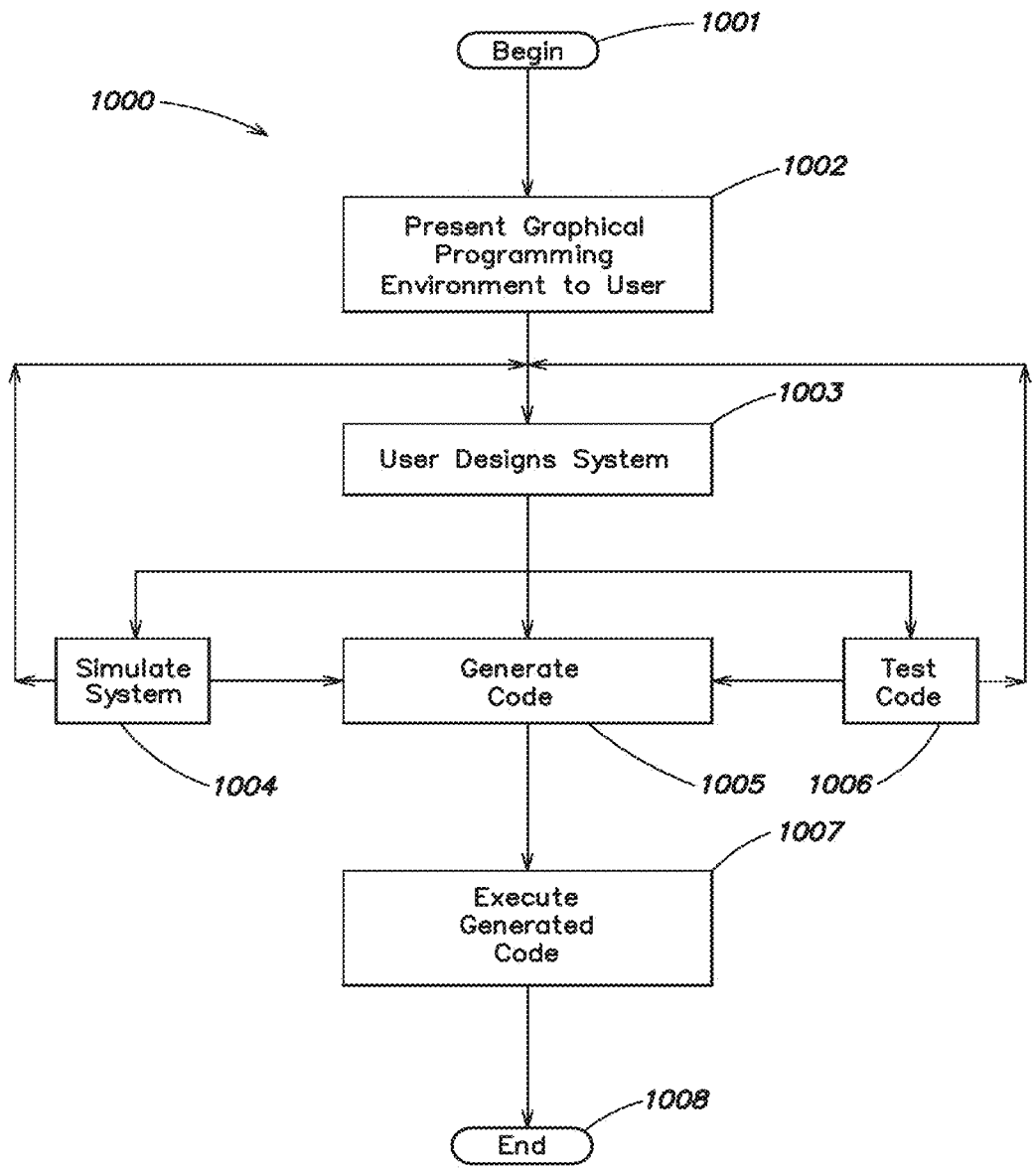
FIGS. 10A-10B show processes for performing a design and execution of a graphically-modeled system according to one embodiment.

Environment 900 may perform one or more processes with blocks that permit such blocks to exhibit behavior responsive to mode changes. For instance, FIG. 10A shows a process 1000 that may be implemented by an environment (e.g., environment 900) to graphically model, simulate and execute code produced in accordance with various embodiments. At block 1001, process 1000 begins. At block 1002, a graphical programming environment (e.g., environment 900) may be presented to a user. As discussed above, a graphical programming environment (e.g., a block diagram to programming environment) may permit one or more users to design a graphical model corresponding to a modeled system, simulate the system's behavior, analyze the performance of the system, and refine the design of the system.

The environment may also allow users to design systems (e.g., at block 1003) through a user interface that allows drafting of block diagram models of the systems. According to one embodiment, one or more blocks may be provided that have the capability of propagating attributed in response to mode change events. Such blocks may be used to model a system, that, when executed, exhibits different execution behavior in response to such mode change events.

Users may perform a number of different functions within the programming environment on a modeled system. For instance, the user may simulate the modeled system (e.g., at block 1004) using, for instance, simulator 930. Such a simulation may include a graphical indication of mode change events in a display of a computer system. Further, a user may test code associated with the modeled system (e.g., at block 1006). Also, the user may be capable of generating code (e.g., at block 1005) using the graphical programming environment. As discussed above, a graphical programming environment may provide a code generator (e.g., code generator 940) that is capable of generating executable code. Such generated code may include one or more code elements responsive to mode change events as discussed above. The generated code may be executed by one or more systems at block 1007. As discussed above, such code may be executed by computer systems, devices, or any other system capable of executing code. For example, a device capable of executing a model is discussed below with respect to FIG. 11.

Figure 10B:
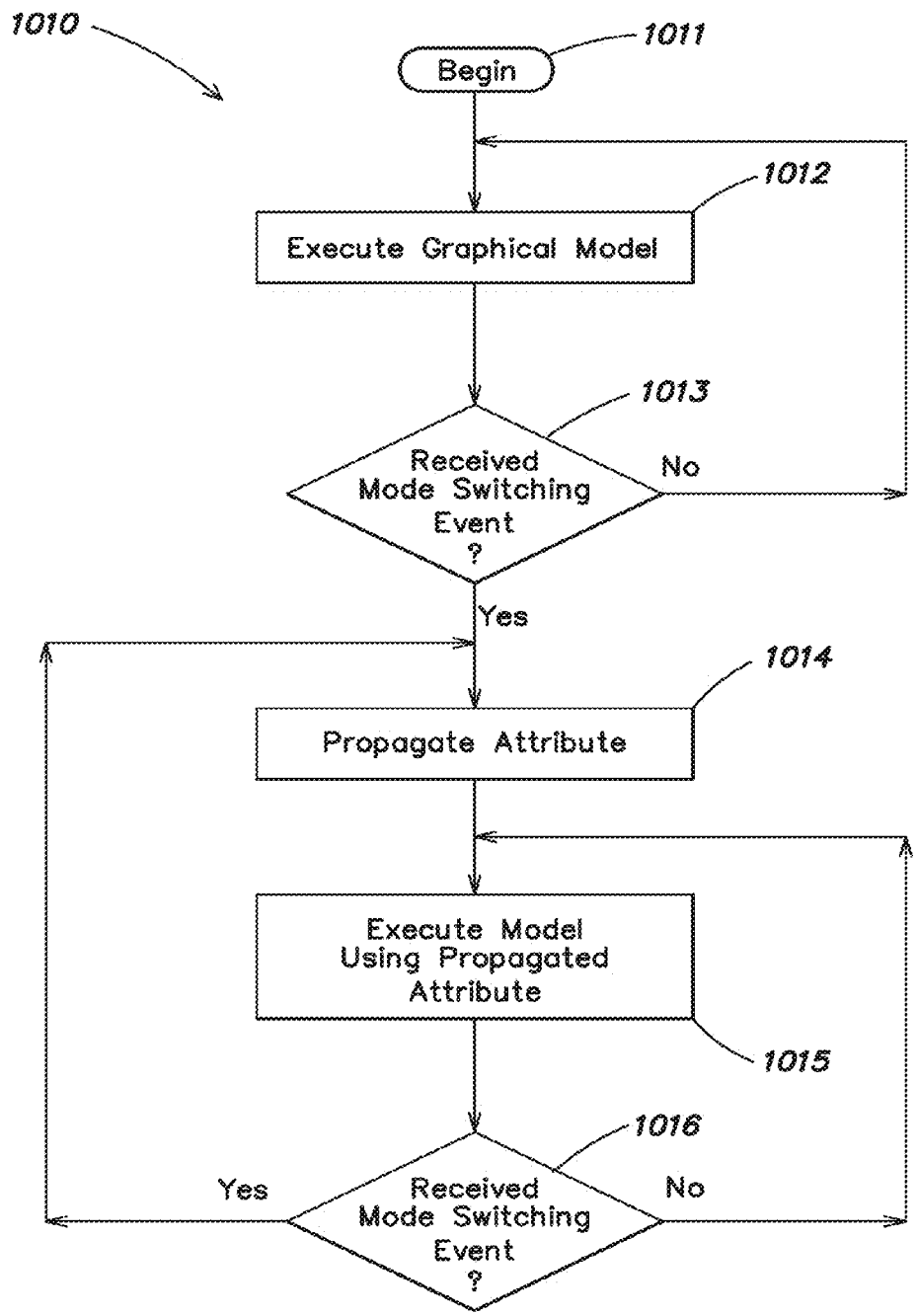

FIG. 10B shows an example operation of a system capable of executing a graphical model. At block 1011, process 1010 begins. At block 1012, a system, device or other entity capable of executing a model executes code associated with such a model at block 1012. The device may be, for example, an embedded system that executes code produced, for example, by code generator 940. At block 1013, it is determined whether a mode switching event is received. As discussed above, the mode switching event may be generated, for instance, by a block in a model, or by any other entity capable of generating an event. If a mode switching event is received, the executed code may propagate one or more attributes at block 1014. As discussed above, such attributes may be propagated to other blocks, subsystems, etc. of a modeled system. At block 1015, the model is executed using the propagated attribute(s).

The system may receive further mode switching events that may cause the system, device or other entity to operate in one or more modes. For instance, the system may receive a further mode switching event that causes the system to return to a previous mode or to transition to one of any number of additional modes. In such a case where a further mode switching event is received (e.g., as determined at block 1016), the system may propagate one or more attributes associated with the event.

Figure 11:
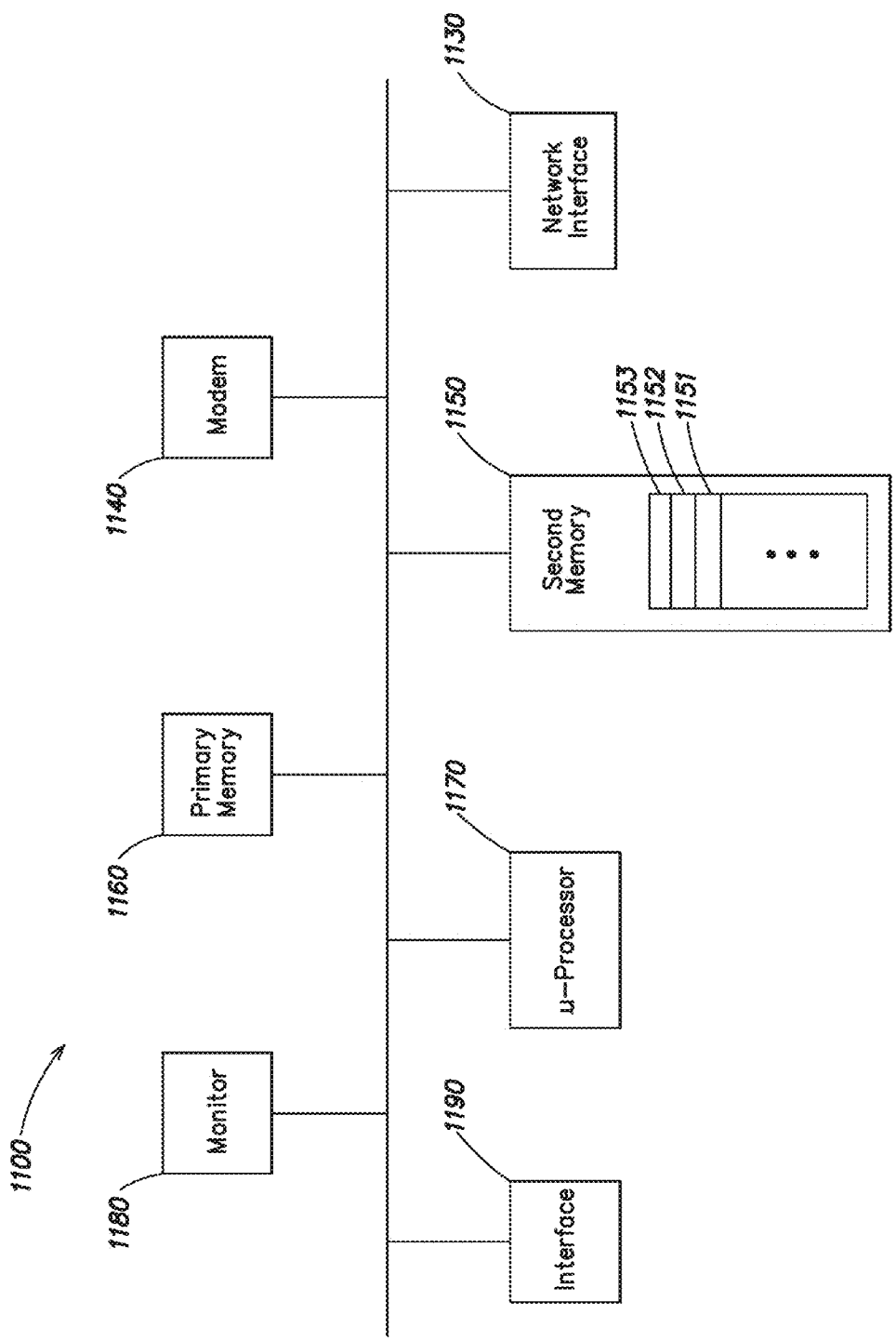
FIG. 11 shows a general-purpose computer system suitable for practicing exemplary embodiments.

FIG. 11 is an exemplary electronic device 1100 that may be used for practicing various aspects, Device 1100 may include a device that executes instructions to perform one or more operations, such as executing a model, generating code, or executing code as discussed above with reference to FIGS. 10A-10B. Device 1100 may be, for example, a general purpose computing device such as a desktop computer, a laptop computer, a client, a server, a mainframe, a personal digital assistant (PDA), a web-enabled cellular telephone, a smart phone, smart sensor/actuator, or another type of device that executes instructions (e.g., an application specific appliance).

Electronic device 1100 includes a network interface 1130, a MODEM 1140, a secondary memory 1150, a primary memory 1160, a microprocessor 1170, a monitor 1180 and interface 1190. For example, interface 1190 may include any type of single or multi-point computer interface such as, for example, a keyboard, mouse, microphone, camera, touch screen, accelerometer, biometric or neural input, or any other type of interface. Microprocessor 1170 may control each component of the electronic device 1100 to run code, such as software tools provided in the graphical programming environment 900. Electronic device 1100 may receive data necessary for controlling the design and simulation of a target system through, for example, the interface 1190. Received data may include control data that may be used to set up operation modes of a block processing block.

Monitor 1180 may display a result generated in the graphical programming environment 1100. For example, monitor 1180 may display modeling results to one or more users. Primary memory 1160 may fetch codes from secondary memory 1150 and provide the codes to the microprocessor 1170 codes. The codes may be executed by the microprocessor 1170 to operate the electronic device 1100 and to run the graphical programming environment 900. Secondary memory 1150 may contain software tools for applications. Secondary memory 1150 may include, in particular, code 1151 for the block library 910, code 1152 for editor 920, and code 1153 for simulator 930. Network interface 1130 and/or MODEM 1140 enable the electronic device 1100 to communicate with other electronic devices through communication networks, such as Internet, intranet, LAN (Local Area Network), WAN (Wide Area Network) or any other type of communication network. Further, communication facilities may support distributed implementations of exemplary embodiments. In addition, code may represent, for example, remote procedure calls and remote method invocations and the code may be based on service oriented architectures.

Although the examples above have been described relative to a Simulink® software Product® block diagram model, it should be appreciated that aspects may be practiced relative to models implemented in other graphical modeling environments including UML modeling environments such as the Rational Rose modeling environment available from International Business Machines, Inc. of White Plains, N.Y. For instance, in UML, elements used in component diagrams, activity diagrams, and other diagram types may be capable of responding to mode switching events. Other graphical modeling environments may implement various aspects, including but not limited to, SimMechanics and SimElectronics environments available from The MathWorks, the LabVIEW environment available from National Instruments Corporation of Austin, Tex., SysML available from SysML Partners at http://www.sysml.org, MaRTE OS available from the Universidad de Catabria, Spain, SCADE available from Esterel Technologies, Mountain View, Calif., Modelica available from the Modelica Association at http://www.modelica.org, Dymola available from Dynasim AB at http://www.Dynasim.se, AUTOSAR available from the AUTOSAR development partnership at http://www.autosar.org, SystemC available from the Open SystemC Initiative at http://www-.systemc.org, CORBA available from the Object Management Group Inc. at http://www.corba.org, C++ available from a variety of vendors, among others.

CONCLUSION

Implementations may provide devices and techniques that propagate attributes in models. The foregoing description of exemplary embodiments provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 10A-10B, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 5A-9 and 11 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise. The scope of the invention is defined by the claims and their equivalents.

What is claimed is:

1. A non-transitory computer-readable medium storing computer-executable instructions, the computer-executable instructions comprising:
one or more instructions that when executed on a processor cause the processor to:
operate a system in a first mode having a first set of behaviors, the system being represented by a graphical model comprising a first element including at least one input port and at least one output port;
receive a mode switching event;
operate the system in a second mode having a second set of behaviors based on the received mode switching event; and
the operating the system in the second mode comprising:
receiving a map identifying at least one constraint, the constraint identifying a dimension of the at least one input port, the dimension of the at least one input port used to determine a dimension of the at least one output port, and
setting, responsive to a selection of the at least one constraint, the dimension of the at least one output port, the setting based on the selected at least one constraint.

2. The computer-readable medium for claim 1, wherein the computer-executable instructions are generated from the graphical model representing a modeled system.

3. The computer-readable medium of claim 2, wherein the graphical model comprises a first element having a first attribute and a second element, and wherein the computer-readable medium further storing one or more instructions for:
associating the mode switching event with the first element of the graphical model; and
propagating, based on the mode switching event:
the first attribute within the first element, or the first attribute from the first element to the second element.

4. The computer-readable medium of claim 1, wherein the first set of behaviors is operable to permit the system to process a first set of conditions, and wherein the second set of behavior is operable to permit the system to process a second set of conditions.

5. The computer-readable medium of claim 1, wherein the receiving the mode switching event occurs at runtime.

6. The computer-readable medium of claim 2, wherein the graphical model comprises a first element having a first attribute, and wherein code associated with the first element is responsive to the received mode switching event.

7. The computer-readable medium of claim 6, wherein the code associated with the first model is capable of propagating the first attribute in response to the received mode switching event.

8. The computer-readable medium of claim 7, wherein the code is adapted to propagate the first attribute during execution of the code.

9. A non-transitory computer-readable medium storing computer-executable instructions, the instructions comprising:
one or more instructions that when executed on a processor cause the processor to:
display a graphical model representing a system configured to operate using a first behavior, the graphical model having a fixed model variable access structure and comprising:
a first element having a first attribute;
a second element having a second attribute;
associate a mode switching event with the first element;
determine the second attribute to be consistent with the first attribute, the determining being responsive to the mode switching event; and execute the graphical model using the determined second attribute to produce an execution result that reflects a second behavior according to the second attribute of the graphical model.

10. The computer-readable medium of claim 9, wherein the fixed model variable access structure is a fixed read structure.

11. The computer-readable medium of claim 9, wherein the fixed model variable access structure is a fixed write structure.

12. The computer-readable medium of claim 9, wherein the fixed model variable access structure is a fixed read and write structure.

13. The computer-readable medium of claim 9, wherein the fixed model variable access structure is a fixed compile-time structure.

14. The computer-readable medium of claim 9, wherein the instructions further comprise instructions that, when executed on the processor, cause the processor to propagate the first attribute to the second attribute.

15. The computer-readable medium of claim 9, wherein the instructions further comprise instructions that, when executed on the processor, cause the processor to solve at least one constraint associated with the first attribute and at least one constraint associated with the second attribute.

16. The computer-readable medium of claim 15, wherein the at least one constraint associated with the first attribute and the at least one constraint associated with the second attribute are related.

17. The computer-readable medium of claim 15, wherein the at least one constraint associated with the first attribute and the at least one constraint associated with the second attribute are a same constraint.

18. The computer-readable medium of claim 9, wherein the first element and the second element are not directly connected.

19. The computer-readable medium of claim 9, wherein the first element and the second element are connected via a nondirect feedthrough element.

20. The computer-readable medium of claim 19, wherein the nondirect feedthrough element comprises an input and an output, and wherein the nondirect feedthrough element does not have a direct relationship between the input and the output.

21. The computer-readable medium of claim 19, wherein the nondirect feedthrough element includes at least one of a group comprising:
    a delay element; a pre element; a shift element; and a memory element.

22. The computer-readable medium of claim 19, wherein the nondirect feedthrough element includes a filter block.

23. The computer-readable medium of claim 9, wherein the instructions further comprise instructions that, when executed on the processor, cause the processor to define a process by which the second attribute is determined.

24. The computer-readable medium of claim 9, further comprising instructions that, when executed by the processor, cause the processor to display an option to select a functionality that determines the second attribute responsive to the mode switching event.

25. The computer-readable medium of claim 9, wherein the at least one attribute comprises at least one signal attribute that includes a signal dimension.

26. The computer-readable medium of claim 9, wherein the at least one attribute comprises at least one signal attribute that includes a signal data type.

27. The computer-readable medium of claim 9, wherein the at least one attribute comprises at least one signal attribute that includes a signal complexity.

28. The computer-readable medium of claim 9, wherein the at least one attribute comprises at least one signal attribute that includes a signal sample time.

29. The computer-readable medium of claim 9, wherein the at least one attribute comprises at least one signal attribute that includes a signal invocation specification.

30. The computer-readable medium of claim 9, further storing instructions that, when executed by the processor, cause the processor to: selectively reset a state associated with the at least one element in response to the determining the at least one attribute.

31. The computer-readable medium of claim 9, wherein the mode switching event includes an explicit event.

32. The computer-readable medium of claim 9, wherein the mode switching event includes an implicit event.

33. The computer-readable medium of claim 9, wherein the mode switching event is generated by at least one of a state transition diagram, a discrete event diagram, a block diagram, a dataflow diagram, sequence diagram, scenario diagram, truth table, state transition matrix, entity flow diagram, queue/server network, and function block diagram.

34. The computer-readable medium of claim 9, wherein the first element includes at least one port, and wherein the mode switching event is in response to a change in attribute of a received signal associated with the at least one port.

35. The computer-readable medium of claim 9, wherein the graphical model includes at least one of a time-based block diagram, activity diagram, or a dataflow diagram.

36. The computer-readable medium of claim 9, further storing instructions that, when executed by the processor, cause the processor to: indicate that the at least one element propagates the at least one attribute in response to the mode switching event.

37. The computer-readable medium of claim 9, further storing instructions that, when executed by the processor, cause the processor to: receive a flag, the flag indicating that the first element can process the mode switching event.

38. The computer-readable medium of claim 9, wherein the first element includes at least one input port and at least one output port, and wherein the first attribute is a dimension, and wherein the computer-readable medium further stores one or more instructions, that when executed by the processor, cause the processor to:
    receive a map defining at least one constraint, the constraint identifying a dimension of the at least one input port, the dimension used to determine a dimension of the at least one output port; and
    set the dimension of the at least one output port based on the selected at least one constraint.

39. A method comprising:
    operating a system represented by the graphical model in a first mode having a first behavior;
    receiving a mode switching event;
    operating the system in a second mode having a second behavior based on the received mode switching event; and
    operating, responsive to receiving the mode switching event, the system in the second mode.

40. The method of claim 39, wherein the graphical model comprises a first element having a first attribute and a second element, and wherein the method further comprises:
    associating the mode switching event with a first element of the graphical model;
    representing the first element;
    representing the second element having a second attribute; and
    associating a mode switching event with the first element;

determining, responsive to the mode switching event, the second attribute to be consistent with the first attribute.

41. The method of claim 40, wherein determining comprises propagating the first attribute to the second attribute.

42. The method of claim 40, wherein the determining comprises solving at least one constraint associated with the first and second attributes.

43. The method of claim 40, wherein the first element and the second element are not directly connected.

44. The method of claim 40, wherein the second element includes a nondirect feedthrough characteristic.

45. The method of claim 40, wherein the first element and the second element are connected via a nondirect feedthrough element.

46. The method of claim 44, wherein the nondirect feedthrough element comprises an input and an output, and wherein the nondirect feedthrough element does not have a direct relationship between the input and the output.

47. The method of claim 44, wherein the nondirect feedthrough element includes a delay block.

48. The method of claim 44, wherein the nondirect feedthrough element includes a memory block.

49. The method of claim 40, wherein the determining the second attribute comprises permitting the user to define a process by which the second attribute is determined.

50. The method of claim 40, further comprising displaying to a user an option to select a function that determines the second attribute responsive to the mode switching event.

51. The method of claim 39, wherein the first behavior is operable to permit the system to process a first set of conditions by the system, and wherein the second behavior is operable to permit the system to process a second set of conditions by the system.

52. The method of claim 39, wherein the graphical model comprises a first element including at least one input port and at least one output port, and wherein the method further comprises:
receiving a map defining at least one constraint, the constraint identifying a dimension of the at least one input port, the dimension used to determine a dimension of the at least one output port; and
responsive to a selection of the at least one constraint, setting the dimension of the at least one output port based on the selected at least one constraint.

53. The method of claim 39, wherein the graphical model comprises a first element having a first attribute, and wherein code associated with the first element is responsive to the received mode switching event.

54. The method of claim 53, wherein the code associated with the first model is capable of propagating the first attribute in response to the received mode switching event.

55. The method of claim 54, wherein the code is adapted to propagate the first attribute during execution of the code.

56. A system comprising:
a memory configured to:
store information representing a graphical model,
the graphical model representing a modeled system,
the graphical model having a fixed model variable access structure,
the graphical model including at least one element,
the at least one element having associated code that is configured to:
make at least one attribute associated with a port of the element consistent another attribute of the at least one element or another element; and
a processor configured to:
execute the code,
and responsive to a mode switching event, defining the at least one attribute to be consistent with the another attribute.

57. The system of claim 56, wherein the system operates in a first mode having a first behavior, and in response to receiving the mode switching event, the system operates in a second mode having a second behavior.

58. The system of claim 57, wherein the mode switching event is in response to a change in attribute of a received signal associated with the port of the element.

59. The system of claim 56, wherein the attribute is propagated through the at least one element or to another element.

60. The system of claim 56, wherein the fixed model variable access structure is a fixed read structure.

61. The system of claim 56, wherein the fixed model variable access structure is a fixed write structure.

62. The system of claim 56, wherein the fixed model variable access structure is a fixed read and write structure.

63. The system of claim 56, wherein the fixed model variable access structure is a fixed compile-time structure.

* * * * *

UNITED STATES PATENT AND TRADEMARK OFFICE
CERTIFICATE OF CORRECTION

PATENT NO. : 9,063,741 B2
APPLICATION NO. : 13/647811
DATED : June 23, 2015
INVENTOR(S) : Ramamurthy Mani et al.

Page 1 of 1

It is certified that error appears in the above-identified patent and that said Letters Patent is hereby corrected as shown below:

On The Title Page, Item (56) Other Publications, line 5, delete "Befor" and insert --Before-- in lieu thereof.

On The Title Page, Item (74), after "Attorney, Agent or Firm", delete "Mullin" and insert --Mullins-- in lieu thereof.

In The Claims

Column 24, line 22, in claim 2, delete "for" and insert --of-- in lieu thereof.

Signed and Sealed this
Fifteenth Day of December, 2015

Michelle K. Lee
*Director of the United States Patent and Trademark Office*